US008239052B2

(12) United States Patent
Itoyama et al.

(10) Patent No.: US 8,239,052 B2

(45) Date of Patent: Aug. 7, 2012

(54) SOUND SOURCE SEPARATION SYSTEM, SOUND SOURCE SEPARATION METHOD, AND COMPUTER PROGRAM FOR SOUND SOURCE SEPARATION

(75) Inventors: Katsutoshi Itoyama, Kyoto (JP); Hiroshi Okuno, Kyoto (JP); Masataka Goto, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 430 days.

(21) Appl. No.: 12/595,542

(22) PCT Filed: Apr. 14, 2008

(86) PCT No.: PCT/JP2008/057310

§ 371 (c)(1),
(2), (4) Date: Nov. 23, 2009

(87) PCT Pub. No.: WO2008/133097

PCT Pub. Date: Nov. 6, 2008

(65) Prior Publication Data

US 2010/0131086 A1 May 27, 2010

(30) Foreign Application Priority Data

Apr. 13, 2007 (JP) ................................ 2007-106576

(51) Int. Cl.
*G06F 17/00* (2006.01)

(52) U.S. Cl. ........................................... 700/94; 84/616

(58) Field of Classification Search .................... 84/616; 700/94
See application file for complete search history.

(56) References Cited

U.S. PATENT DOCUMENTS

| | | | | |
|---|---|---|---|---|
| 6,930,236 | B2 * | 8/2005 | Jung | 84/616 |
| 2005/0283361 | A1 | 12/2005 | Yoshii | |

FOREIGN PATENT DOCUMENTS

| | | |
|---|---|---|
| JP | 11-095753 | 4/1999 |
| JP | 2002-244691 | 8/2002 |
| JP | 3413634 | 4/2003 |

* cited by examiner

*Primary Examiner* — Walter F Briney, III

(74) *Attorney, Agent, or Firm* — Rankin, Hill & Clark LLP

(57) ABSTRACT

An audio signal produced by playing a plurality of musical instruments is separated into sound sources according to respective instrument sounds. Each time a separation process is performed, the updated model parameter estimation/storage section 114 estimates parameters respectively contained in updated model parameters such that updated power spectrograms gradually change from a state close to initial power spectrograms to a state close to a plurality of power spectrograms most recently stored in a power spectrogram separation/storage section. Respective sections including the power spectrogram separation/storage section 112 and an updated distribution function computation/storage section 118 repeatedly perform process operations until the updated power spectrograms change from the state close to the initial power spectrograms to the state close to the plurality of power spectrograms most recently stored in the power spectrogram separation/storage section 112. The final updated power spectrograms are close to the power spectrograms of single tones of one musical instrument contained in the input audio signal formed to contain harmonic and inharmonic models.

12 Claims, 9 Drawing Sheets

SOUND SOURCE SEPARATION SYSTEM, SOUND SOURCE SEPARATION METHOD, AND COMPUTER PROGRAM FOR SOUND SOURCE SEPARATION

TECHNICAL FIELD

The present invention relates to a system, a method, and a program for sound source separation that enable separation of an instrument sound signal corresponding to each musical instrument from an input audio signal containing a plurality of types of instrument sound signals. The present invention relates in particular to a system, a method, and a computer program for sound source separation that separate an "audio signal of sound mixtures obtained by playing a plurality of musical instruments" containing both harmonic-structure and inharmonic-structure signal components into sound sources for respective instrument parts.

BACKGROUND ART

There is known an audio signal processing system that can separate an inharmonic-structure signal component such as from drums, for example, contained in a musical audio signal (hereinafter simply referred to as "audio signal") output from a speaker to independently increase and reduce the volume of a sound produced on the basis of the inharmonic-structure signal component without influencing other signal components (see Patent Document 1, for example).

The conventional system exclusively addresses inharmonic-structure signals contained in an audio signal. Therefore, the conventional system cannot separate "sound mixtures containing both harmonic-structure and inharmonic-structure signal components" according to respective instrument sounds.

There have been found no reports of a sound source separation technique that uses a model (hereinafter referred to as "harmonic/inharmonic mixture model") that handles a model representing a harmonic structure (hereinafter referred to as "harmonic model") and a model representing an inharmonic structure (hereinafter referred to as "inharmonic model") at the same time.

[Patent Document 1] Japanese Unexamined Patent Application Publication No. 2006-5807

DISCLOSURE OF INVENTION

Problem to be Solved by the Invention

In general, the waveform of a harmonic-structure signal is formed by overlapping a fundamental frequency (F0) and its n-th harmonic. Thus, intuitive examples of the harmonic-structure signal waveform include signal waveforms of sounds produced from pitched musical instruments (such as the piano, flute, and guitar). For a model with a harmonic-structure signal waveform, as is known, sound source separation can be performed by estimating features (such as the pitch, amplitude, onset time, duration, and timbre) of power spectrograms of an audio signal. Various methods for extracting the features are proposed. In many of the methods, functions including parameters are defined to estimate the parameters with adaptive learning.

In contrast, the waveform of an inharmonic-structure signal includes neither a fundamental frequency nor a harmonic, unlike harmonic-structure signal waveforms. For example, there may be the inharmonic-structure signal waveform including waveforms of sounds produced from unpitched musical instruments (such as drums). A model with an inharmonic-structure signal waveform can be represented only with power spectrograms.

The difficulty in handling both the harmonic and inharmonic structures at the same time lies in that because there are almost no constraints on model parameters, all the parameters must be handled at the same time. If all the parameters are handled at the same time, the model parameters may not be desirably settled in the adaptive learning.

In order to freely adjust the volumes of all the instrument parts in an ensemble, however, it is essential to handle both the harmonic structure and the inharmonic structure at the same time. Some instrument sounds that are generally classified as having a harmonic structure occasionally involve a signal waveform that is not exactly harmonic because of the physical structure of the musical instrument. For example, the piano produces a sound by striking a string with a hammer to initiate a sound and causing the sound to resonate in a body portion of the piano. Therefore, the sound of the piano contains, to be exact, both a harmonic-structure audio signal produced by the resonance and an inharmonic-structure audio signal produced by the hammer strike.

That is, in order to separate all the sound sources contained in a musical piece, it is important to desirably settle the model parameters while handling both harmonic and inharmonic audio signals at the same time.

It is therefore a main object of the present invention to provide a system, a computer program, and a method for sound source separation that separate sound sources of sound mixtures containing both harmonic and inharmonic audio signal components.

Means for Solving the Problems

A sound source separation system according to the present invention includes at least a musical score information data storage section, a model parameter assembled data preparation/storage section, a first power spectrogram generation/storage section, an initial distribution function computation/storage section, a power spectrogram separation/storage section, an updated model parameter estimation/storage section, a second power spectrogram generation/storage section, and an updated distribution function computation/storage section.

The musical score information data storage section stores musical score information data, the musical score information data being temporally synchronized with an input audio signal (a signal of sound mixtures) containing a plurality of instrument sound signals corresponding to a plurality of types of instrument sounds produced from a plurality of types of musical instruments, the musical score information data relating to a plurality of types of musical scores to be respectively played by the plurality of types of musical instruments corresponding to the plurality of instrument sound signals. The musical score information data may be a standard MIDI file (SMF), for example.

The model parameter assembled data preparation/storage section uses a plurality of model parameters. The plurality of model parameters are prepared in advance to represent a plurality of types of single tones respectively produced from the plurality of types of musical instruments with a plurality of harmonic/inharmonic mixture models each including a harmonic model and an inharmonic model. The plurality of model parameters contain a plurality of parameters for respectively forming the plurality of harmonic/inharmonic mixture models. The model parameter assembled data preparation/storage section first respectively replaces a plurality of single tones contained in the plurality of types of musical scores with a plurality of model parameters containing a plurality of parameters for respectively forming the harmonic/inharmonic mixture models. The model parameter assembled data preparation/storage section then prepares a plurality of types of model parameter assembled data corresponding to the plurality of types of musical scores and formed by assembling the plurality of model parameters, and stores the plurality of types of model parameter assembled data in storage means.

The plurality of model parameters containing a plurality of parameters for respectively forming the plurality of harmonic/inharmonic mixture models may be prepared in any way. For example, a tone model-structuring model parameter preparation/storage section may be provided. The tone model-structuring model parameter preparation/storage section prepares a plurality of model parameters on the basis of a plurality of templates. The plurality of templates are represented with a plurality of standard power spectrograms corresponding to a plurality of types of single tones respectively produced by the plurality of types of musical instruments. The plurality of model parameters are prepared to represent the plurality of types of single tones with a plurality of harmonic/inharmonic mixture models each including a harmonic model and an inharmonic model. The plurality of model parameters contain a plurality of parameters for respectively structuring the plurality of harmonic/inharmonic mixture models. The tone model-structuring model parameter preparation/storage section stores the plurality of model parameters in storage means in advance. In the case where such a tone model-structuring model parameter preparation/storage section is provided, the model parameter assembled data preparation/storage section prepares the model parameter assembled data using the plurality of model parameters stored in the tone model-structuring model parameter preparation/storage section.

A template is a power spectrogram of a sample sound (template sound) of each single tone generated by a MIDI sound source on the basis of a musical score in a MIDI file, for example. Specifically, a template is a plurality of types of single tones (a plurality of types of single tones at different pitches) that may be produced by a certain type of musical instrument respectively represented with standard power spectrograms. That is, a template may be a sound of "do" produced from a standard guitar represented with a standard power spectrogram. The power spectrogram of a template of a single tone of "do" for the guitar is more or less similar to, but is not the same as, the power spectrogram of a single tone of "do" in an instrument sound signal for the guitar contained in the input audio signal. A harmonic/inharmonic mixture model is defined, for a time t, a frequency f, a k-th musical instrument, and an l-th single tone, as the linear sum of a harmonic model $H_{kl}(t, f)$ representing a harmonic structure and an inharmonic model $I_{kl}(t, f)$ representing an inharmonic structure. The harmonic/inharmonic mixture model represents, with one model, the power spectrogram of a single tone containing both harmonic-structure and inharmonic-structure signal components. Thus, in the case where the power spectrogram for a k-th musical instrument and an l-th single tone is defined as $J_{kl}(t, f)$, the harmonic/inharmonic mixture model can be conceptually represented as $J_{kl}(t, f)=H_{kl}(t, f)+I_{kl}(t, f)$.

The plurality of templates corresponding to a plurality of types of single tones also satisfy the harmonic/inharmonic mixture model.

In order to prepare a plurality of model parameters containing a plurality of parameters for respectively forming the plurality of harmonic/inharmonic mixture models, there may be used: audio conversion means that converts information on a plurality of single tones for the plurality of musical instruments contained in the musical score information data into a plurality of parameter tones; and tone model-structuring model parameter preparation section that prepares a plurality of model parameters, the plurality of model parameters being prepared to represent a plurality of power spectrograms of the plurality of parameter tones with a plurality of harmonic/inharmonic mixture models each including a harmonic model and an inharmonic model, the plurality of model parameters containing a plurality of parameters for respectively structuring the plurality of harmonic/inharmonic mixture models.

The first power spectrogram generation/storage section reads a plurality of the model parameters at each time from the plurality of types of model parameter assembled data to generate a plurality of initial power spectrograms corresponding to the read model parameters using the plurality of parameters respectively contained in the read model parameters and a predetermined first model parameter conversion formula, and stores the plurality of initial power spectrograms in storage means.

The first model parameter conversion formula may be the following harmonic/inharmonic mixture model:

$$h_{kl}=r_{klc}(H_{kl}(t,f)+I_{kl}(t,f))$$

In the above formula, $h_{kl}$ is a power spectrogram of a single tone, and $r_{klc}$ is a parameter representing a relative amplitude in each channel. $H_{kl}(t,f)$ is a harmonic model formed by a plurality of parameters representing features including an amplitude, temporal changes in a fundamental frequency F0, a y-th Gaussian weighted coefficient representing a general shape of a power envelope, a relative amplitude of an n-th harmonic component, an onset time, a duration, and diffusion along a frequency axis. $I_{kl}(t,f)$ is an inharmonic model represented by a nonparametric function.

The initial distribution function computation/storage section first synthesizes the plurality of initial power spectrograms stored in the first power spectrogram generation/storage section at each time (at which one single tone is present on a musical score) to prepare a synthesized power spectrogram at each time. The initial distribution function computation/storage section then computes at each time a plurality of initial distribution functions indicating proportions (ratios) of the plurality of initial power spectrograms to the synthesized power spectrogram at each time, and stores the plurality of initial distribution functions in storage means. The initial distribution functions include a plurality of proportions for a plurality of frequency components contained in a power spectrogram. The initial distribution functions allow distribution to be equally performed for both harmonic and inharmonic models forming a power spectrogram.

The power spectrogram separation/storage section separates a plurality of power spectrograms corresponding to the plurality of types of musical instruments at each time from a power spectrogram of the input audio signal at each time using the plurality of initial distribution functions at each time, and stores the plurality of power spectrograms in storage means in a first separation process. The power spectrogram separation/storage section separates a plurality of power spectrograms corresponding to the plurality of types of musical instruments at each time from the power spectrogram of the input audio signal at each time using a plurality of updated distribution functions, and stores the plurality of power spectrograms in the storage means in second and subsequent separation processes.

The updated model parameter estimation/storage section estimates a plurality of updated model parameters form the plurality of power spectrograms separated at each time. The plurality of updated model parameters contain a plurality of parameters necessary to represent the plurality of types of single tones with the harmonic/inharmonic mixture models. The updated model parameter estimation/storage section then prepares a plurality of types of updated model parameter assembled data formed by assembling the plurality of updated model parameters, and stores the plurality of types of updated model parameter assembled data in storage means. The estimation process performed by the updated model parameter estimation/storage section will be described later.

The second power spectrogram generation/storage section reads a plurality of the updated model parameters at each time from the plurality of types of updated model parameter assembled data stored in the updated model parameter estimation/storage section to generate a plurality of updated power spectrograms corresponding to the read updated model parameters using the plurality of parameters respectively contained in the read updated model parameters and a predetermined second model parameter conversion formula, and stores the plurality of updated power spectrograms in storage means. The second model parameter conversion formula may be the same as the first model parameter conversion formula.

The updated distribution function computation/storage section synthesizes the plurality of updated power spectrograms stored in the second power spectrogram generation/storage section at each time to prepare a synthesized power spectrogram at each time. The updated distribution function computation/storage section then computes at each time the plurality of updated distribution functions indicating proportions of the plurality of updated power spectrograms to the synthesized power spectrogram at each time, and stores the plurality of updated distribution functions in storage means. As with the initial distribution functions, the updated distribution functions also allow distribution to be equally performed for both harmonic and inharmonic models forming a power spectrogram.

The updated model parameter estimation/storage section is configured to estimate the plurality of parameters respectively contained in the plurality of updated model parameters such that the plurality of updated power spectrograms gradually change from a state close to the plurality of initial power spectrograms to a state close to the plurality of power spectrograms most recently stored in the power spectrogram separation/storage section each time the power spectrogram separation/storage section performs the separation process for the second or subsequent time. The power spectrogram separation/storage section, the updated model parameter estimation/storage section, the second power spectrogram generation/storage section, and the updated distribution function computation/storage section repeatedly perform process operations until the plurality of updated power spectrograms change from the state close to the plurality of initial power spectrograms to the state close to the plurality of power spectrograms most recently stored in the power spectrogram separation/storage section. Thus, the final updated power spectrograms prepared on the basis of the updated model parameters of respective single tones are close to the power spectrograms of single tones of one musical instrument contained in the input audio signal formed to contain harmonic and inharmonic models. According to the present invention, therefore, it is possible to separate power spectrograms of instrument sounds in consideration of both harmonic and inharmonic models. That is, according to the present invention, it is possible to separate instrument sounds (sound sources) that are close to instrument sounds in the input audio signal.

The updated model parameter estimation/storage section preferably estimates the parameters using a cost function. Preferably, the cost function is a cost function J defined on the basis of a sum $J_0$ of all of KL divergences $J_1\times\alpha$ ($\alpha$ is a real number that satisfies $0\leqq\alpha\leqq 1$) between the plurality of power spectrograms at each time stored in the power spectrogram separation/storage section and the plurality of updated power spectrograms at each time stored in the second power spectrogram generation/storage section and KL divergences $J_2\times(1-\alpha)$ between the plurality of updated power spectrograms at each time stored in the second power spectrogram generation/storage section and the plurality of initial power spectrograms at each time stored in the first power spectrogram generation/storage section, and used each time the power spectrogram separation/storage section performs the separation process, for example. The plurality of parameters respectively contained in the plurality of updated model parameters are estimated to minimize the cost function. The updated model parameter estimation/storage section is configured to increase $\alpha$ each time the separation process is performed. The power spectrogram separation/storage section, the updated model parameter estimation/storage section, the second power spectrogram generation/storage section, and the updated distribution function computation/storage section repeatedly perform process operations until $\alpha$ becomes 1, thereby achieving sound source separation. $\alpha$ is set to 0 when the power spectrogram separation/storage section performs the first separation process. Particularly, by estimating the parameters contained in the updated model parameters in this way, the parameters contained in the updated model parameters can reliably be settled in a stable state.

By using such a cost function, it is possible to impose various constraints, and to improve the precision of parameter estimation. For example, the cost function may include a constraint for the inharmonic model not to represent a harmonic structure. If such a constraint is included, it is possible to reliably prevent the occurrence of erroneous estimation which may occur when a harmonic structure is represented by an inharmonic model.

If the harmonic model includes a function $\mu_{kl}(t)$ for handling temporal changes in a pitch, the cost function may include a constraint for the fundamental frequency F0 not to be temporally discontinuous. With such a constraint, separated sounds will not vary greatly momentarily.

The cost function may further include a constraint for making a relative amplitude ratio of a harmonic component for a single tone produced by an identical musical instrument constant for the harmonic model, and/or a constraint for making an inharmonic component ratio for a single tone produced by an identical musical instrument constant for the inharmonic model. If such constraints are included, single tones produced by an identical musical instrument will not sound significantly different from each other.

A sound source separation method according to the present invention causes a computer to perform the steps of:

(S1) preparing musical score information data, the musical score information data being temporally synchronized with an input audio signal containing a plurality of instrument sound signals corresponding to a plurality of types of instrument sounds produced from a plurality of types of musical instruments, the musical score information data relating to a plurality of types of musical scores to be respectively played by the plurality of types of musical instruments corresponding to the plurality of instrument sound signals;

(S2) preparing a plurality of types of model parameter assembled data corresponding to the plurality of types of musical scores, by respectively replacing a plurality of single tones contained in the plurality of types of musical scores with a plurality of model parameters, the model parameter assembled data being formed by assembling the plurality of model parameters, the plurality of model parameters being prepared in advance to represent a plurality of types of single tones respectively produced from the plurality of types of musical instruments with a plurality of harmonic/inharmonic mixture models each including a harmonic model and an inharmonic model, and the plurality of model parameters containing a plurality of parameters for respectively forming the plurality of harmonic/inharmonic mixture models;

(S3) reading a plurality of the model parameters at each time from the plurality of types of model parameter assembled data to generate a plurality of initial power spectrograms corresponding to the read model parameters using the plurality of parameters respectively contained in the read model parameters and a predetermined first model parameter conversion formula;

(S4) synthesizing the plurality of initial power spectrograms at each time to prepare a synthesized power spectrogram at each time, and computing at each time a plurality of initial distribution functions indicating proportions of the plurality of initial power spectrograms to the synthesized power spectrogram at each time;

(S5) in a first separation process, separating a plurality of power spectrograms corresponding to the plurality of types of musical instruments at each time from a power spectrogram of the input audio signal at each time using the plurality of initial distribution functions at each time, and in second and subsequent separation processes, separating a plurality of power spectrograms corresponding to the plurality of types of musical instruments at each time from the power spectrogram of the input audio signal at each time using a plurality of updated distribution functions;

(S6) estimating a plurality of updated model parameters from the plurality of power spectrograms separated at each time, the plurality of updated model parameters containing a plurality of parameters necessary to represent the plurality of types of single tones with the harmonic/inharmonic mixture models, to prepare a plurality of types of updated model parameter assembled data formed by assembling the plurality of updated model parameters;

(S7) reading a plurality of the updated model parameters at each time from the plurality of types of updated model parameter assembled data to generate a plurality of updated power spectrograms corresponding to the read updated model parameters using the plurality of parameters respectively contained in the read updated model parameters and a predetermined second model parameter conversion formula;

(S8) synthesizing the plurality of updated power spectrograms at each time to prepare a synthesized power spectrogram at each time, and computing at each time the plurality of updated distribution functions indicating proportions of the plurality of updated power spectrograms to the synthesized power spectrogram at each time;

(S9) in the step of estimating the updated model parameter, estimating the plurality of parameters respectively contained in the plurality of updated model parameters such that the plurality of updated power spectrograms gradually change from a state close to the plurality of initial power spectrograms to a state close to the plurality of power spectrograms most recently separated in the step of separating the power spectrogram each time the separation process is performed for the second or subsequent time in the step of preparing the updated model parameter assembled data; and (S10) repeatedly performing the step of separating the power spectrogram, the step of estimating the updated model parameter, the step of generating the updated power spectrogram, and the step of computing the updated distribution function until the plurality of updated power spectrograms change from the state close to the plurality of initial power spectrograms to the state close to the plurality of power spectrograms most recently separated in the step of separating the power spectrogram.

A computer program for sound source separation according to the present invention is configured to cause a computer to execute the respective steps of the above method.

BEST MODE FOR CARRYING OUT THE INVENTION

The best mode for carrying out the present invention (hereinafter referred to as "embodiment") will be described in detail below.

Figure 1:
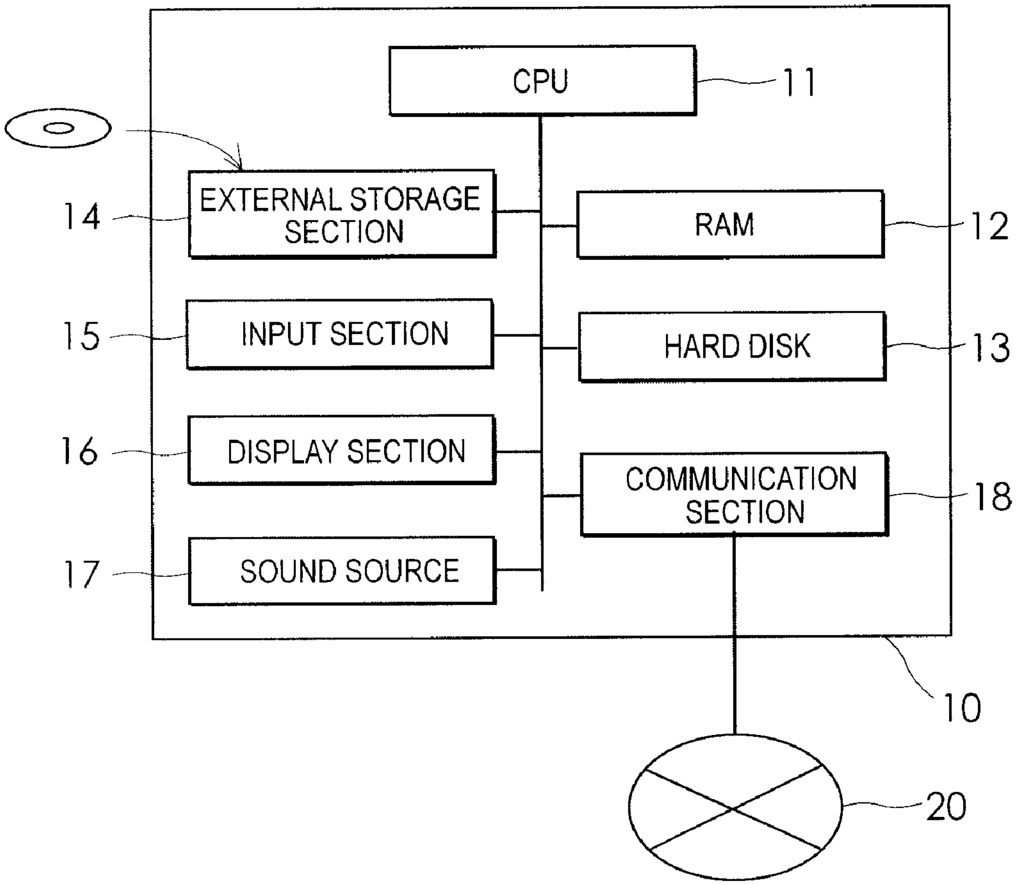
FIG. 1 is a block diagram showing an exemplary configuration of a sound source separation system implemented using a computer.

FIG. 1 is a block diagram showing an exemplary configuration of a sound source separation system according to an embodiment of the present invention implemented using a computer 10. The computer 10 includes a CPU (Central Processing Unit) 11, a RAM (Random Access Memory) 12 such as a DRAM, a hard disk drive (hereinafter referred to as "hard disk") or other mass storage means 13, an external storage section 14 such as a flexible disk drive or a CD-ROM drive, a communication section 18 that communicates with a communication network 20 such as a LAN (Local Area Network) or the Internet. The computer 10 additionally includes an input section 15 such as a keyboard or a mouse, and a display section 16 such as a liquid crystal display. The computer 10 further includes a sound source 17 such as a MIDI sound source.

The CPU 11 operates as calculation means that executes respective steps for performing a power spectrogram separation process and a process (model adaptation) for estimating parameters of updated model parameters to be discussed later.

The sound source 17 includes an input audio signal to be discussed later. The sound source 17 also includes a Standard MIDI File (hereinafter referred to as "SMF") temporally synchronized with the input audio signal for sound source separation as musical score information data. The SMF is recorded in a CD-ROM or the like or in the hard disk 13 via the communication network 20. The term "temporally synchronized" refers to the state in which single tones (equivalent to notes on a musical score) of each instrument part in the SMF are completely synchronized, in the onset time (time at which each sound is produced) and the duration, with single tones of each instrument part in the actually input audio signal of a musical piece.

Recording, editing, playback, and so forth of a MIDI signal is performed by a sequencer or a sequencer software program (not shown). The MIDI signal is treated as a MIDI file. The SMF is a basic file format for recording data for playing a MIDI sound source. The SMF is formed in data units called "chunks", which is the unified standard for securing the compatibility of MIDI files between different sequencers or sequencer software programs. Events of MIDI file data in the SMF format are roughly divided into three types, namely MIDI Events, System Exclusive Events (SysEx Events), and Meta Events. The MIDI Event indicates play data itself. The System Exclusive Event mainly indicates a system exclusive message of MIDI. The system exclusive message is used to exchange information exclusive to a specific musical instrument or communicate special non-musical information or event information. The Meta Event indicates information on the entire performance such as the tempo and the musical time and additional information utilized by a sequencer or a sequencer software program such as lyrics and copyright information. All Meta Events start with 0xFF, which is followed by a byte representing the event type, which is further followed by the data length and data itself. MIDI play programs are designed to ignore Meta Events that they do not recognize. Each event is added with timing information on the temporal timing at which the event is to be executed. The timing information is indicated in terms of the time difference from the execution of the preceding event. For example, if the timing information of an event is "0", the event is executed simultaneously with the preceding event.

In playing music by using the MIDI standard in general, various signals and timbres specific to musical instruments are modeled, and a sound source storing such data is controlled with various parameters. Each track of an SMF corresponds to each instrument part, and contains a separate signal for the instrument part. An SMF also contains information such as the pitch, onset time, duration or offset time, instrument label, and so forth.

Thus, if an SMF is provided, a sample (referred to as "template sound") of a sound that is more or less close to each single tone in an input audio signal can be generated by playing the SMF with a MIDI sound source. It is possible to prepare, from a template sound, a template of data represented with standard power spectrograms corresponding to single tones produced from a certain musical instrument.

A template sound or a template is not completely identical to a single tone or a power spectrogram of a single tone of an actually input audio signal, and inevitably involves an acoustic difference. Therefore, a template sound or a template cannot be used as it is as a separated sound or a power spectrogram for separation. As will be described in detail later, however, if a plurality of parameters contained in updated model parameters can be finally desirably settled by performing learning (referred to as "model adaptation") such that updated power spectrograms of single tones gradually change from a state close to initial power spectrograms to be discussed later to a state close to power spectrograms of the single tones most recently separated from the input audio signal, the template sound or the template is estimated to be the right, or an almost right, separated sound.

Moreover, a quantitative evaluation of how an audio signal after separation is close to an audio signal before synthesis is enabled by utilizing tracks of an SMF.

Figure 2:
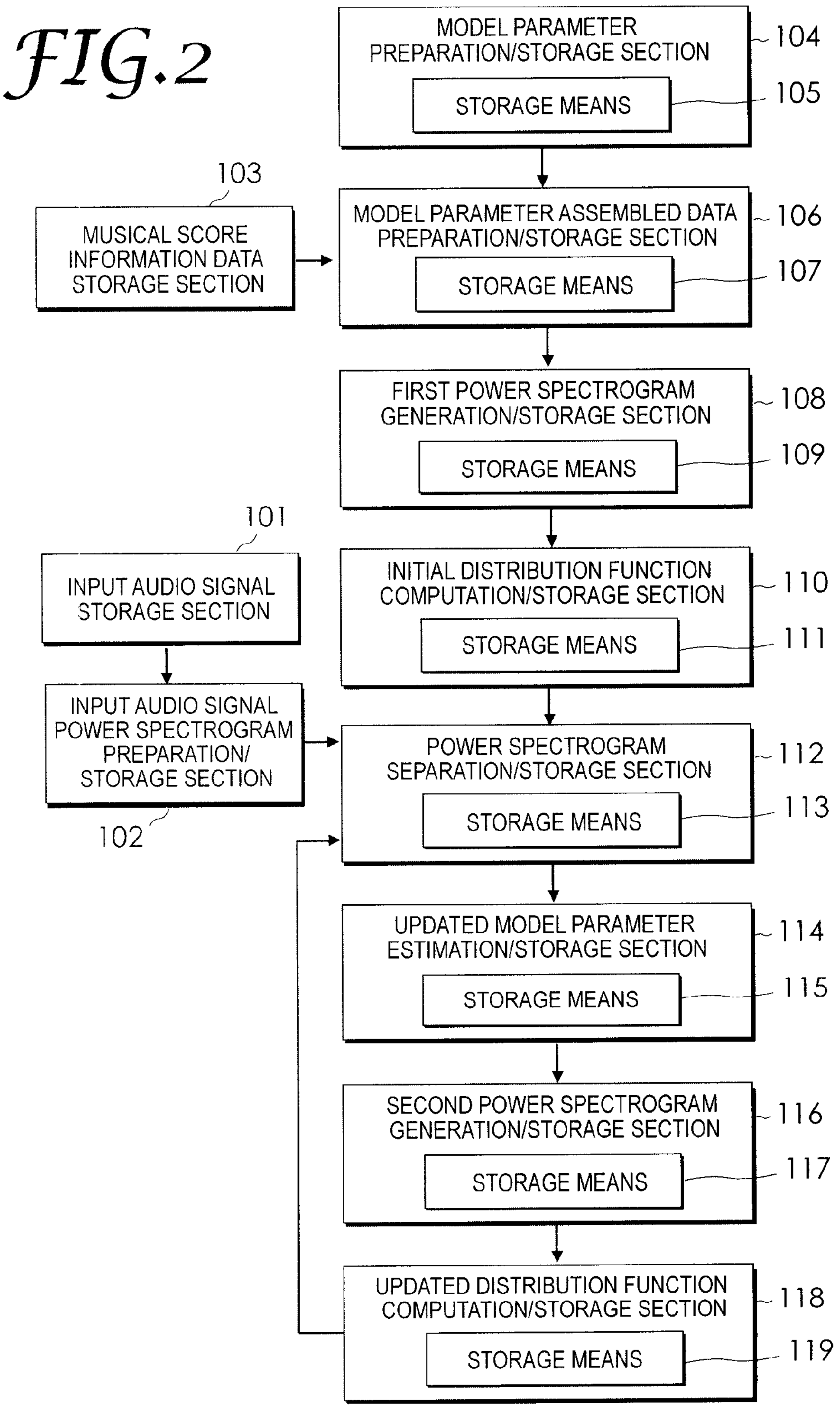
FIG. 2 is a block diagram showing the relationship among a plurality of function implementation means implemented by installing a sound source separation program according to the present invention in the computer of FIG. 1.
Figure 3:
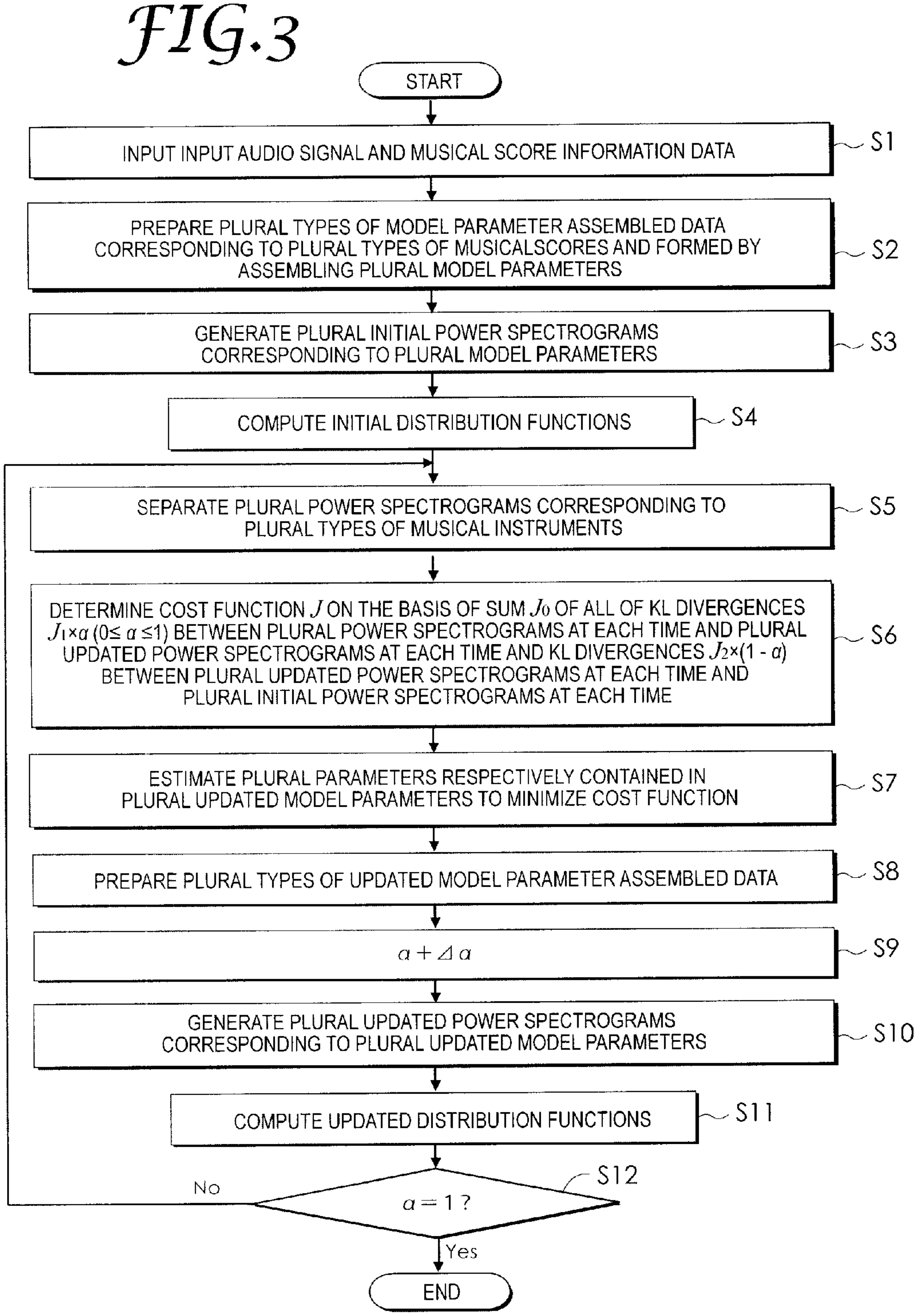
FIG. 3 is a flowchart showing an exemplary algorithm of the sound source separation program.
Figure 4:
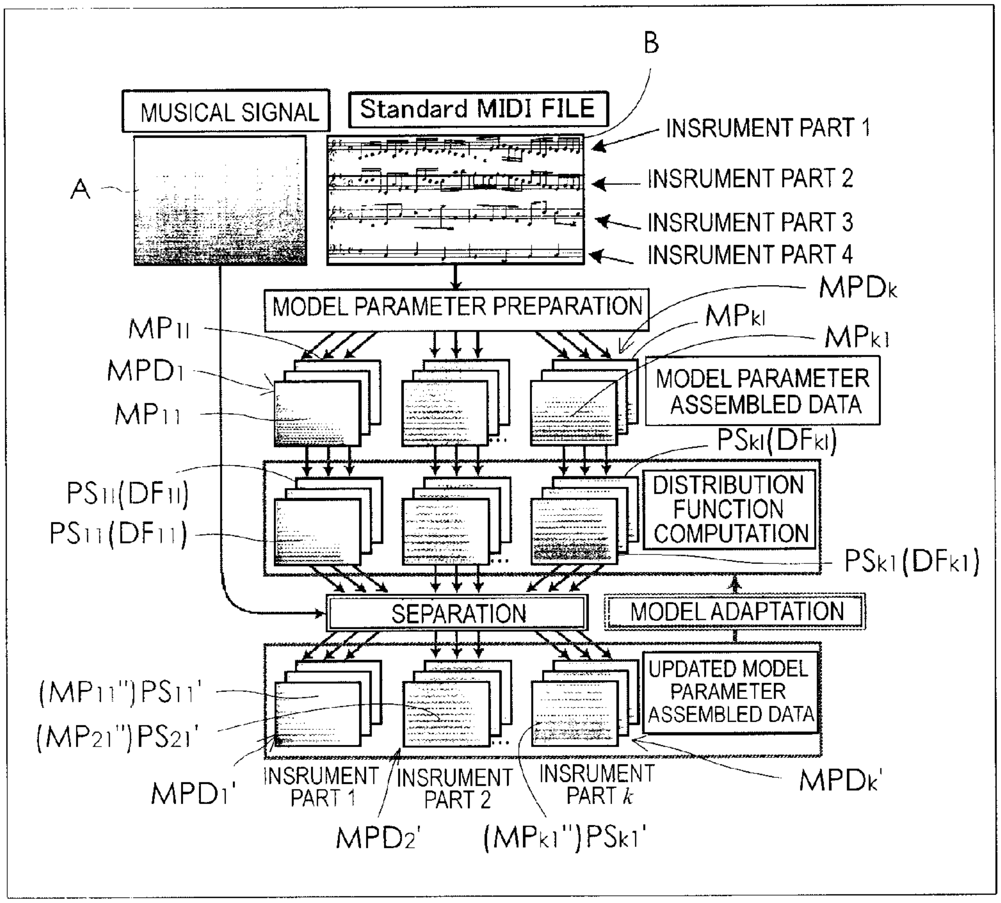
FIG. 4 is a conceptual diagram visually illustrating the flow of a process performed by a sound source separation system according to an embodiment of the present invention.
Figure 5:
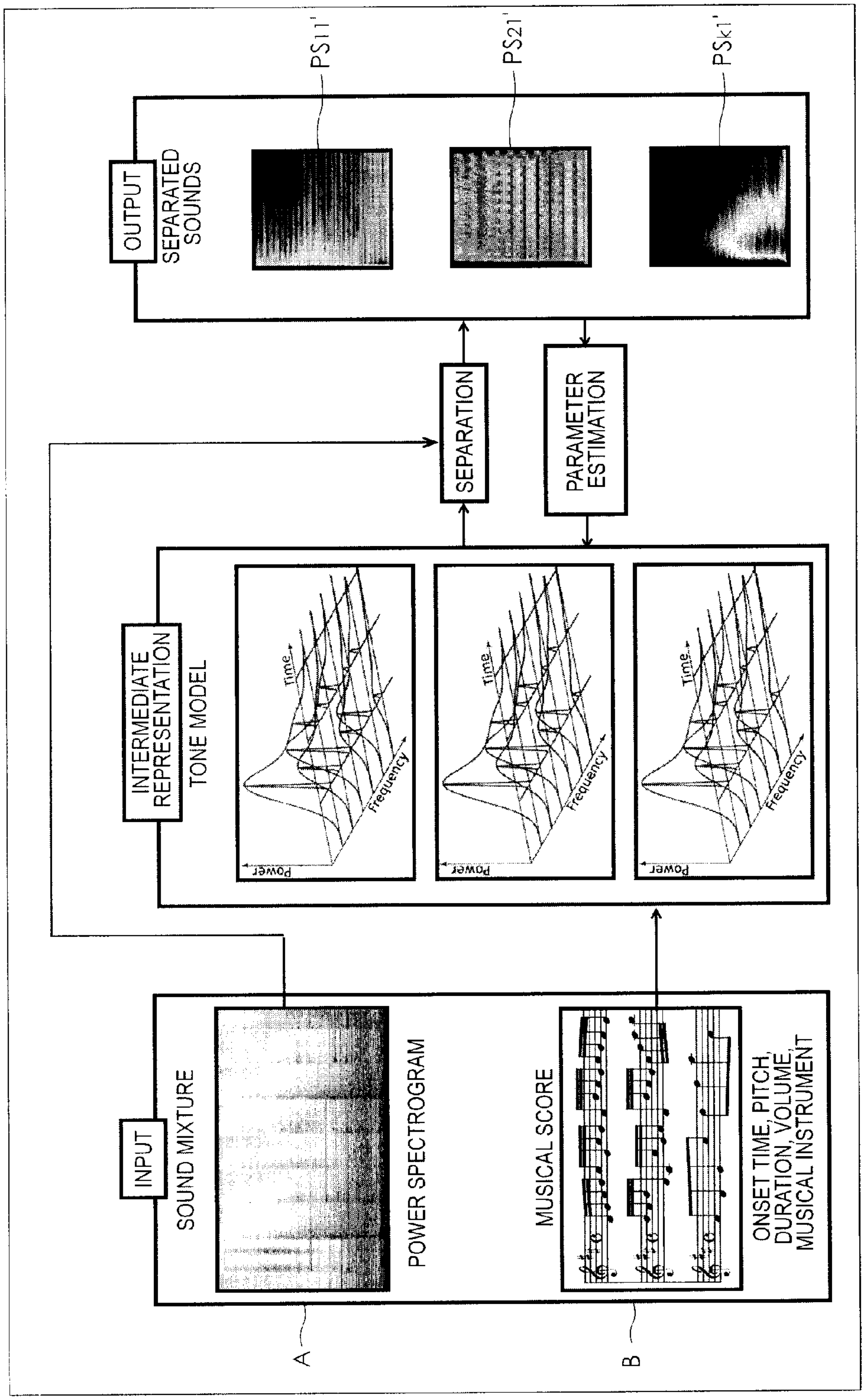
FIG. 5 is a conceptual diagram visually illustrating the flow of the process performed by the sound source separation system according to the embodiment of the present invention.

FIG. 2 is a block diagram showing the relationship among a plurality of function implementation means implemented by installing a sound source separation program according to the present invention in the computer 10 of FIG. 1. FIG. 3 is a flowchart showing an exemplary algorithm of the sound source separation program. FIGS. 4 and 5 are each a conceptual diagram visually illustrating the flow of a process performed by the sound source separation system according to the embodiment. The basic configuration of the sound source separation system is first described with reference to FIGS. 1 to 5, followed by a description of the principle.

The sound source separation system according to the embodiment includes an input audio signal storage section 101, an input audio signal power spectrogram preparation/storage section 102, a musical score information data storage section 103, a model parameter preparation/storage section 104, a model parameter assembled data preparation/storage section 106, a first power spectrogram generation/storage section 108, an initial distribution function computation/storage section 110, a power spectrogram separation/storage section 112, an updated model parameter estimation/storage section 114, a second power spectrogram generation/storage section 116, and an updated distribution function computation/storage section 118.

The input audio signal storage section 101 stores an input audio signal (a signal of sound mixtures) containing a plurality of instrument sound signals corresponding to a plurality of types of instrument sounds produced from a plurality of types of musical instruments. The input audio signal is prepared for the purpose of playing music and obtaining power spectrograms. The input audio signal power spectrogram preparation/storage section 102 prepares power spectrograms from the input audio signal, and stores the power spectrograms. FIGS. 4 and 5 show an exemplary power spectrogram A obtained from the input audio signal. In the power spectrograms, the horizontal axis represents the time, and the vertical axis represents the frequency. In the examples of FIGS. 4 and 5, a plurality of power spectrograms at a plurality of times are displayed side by side.

The musical score information data storage section 103 stores musical score information data temporally synchronized with the input audio signal and relating to a plurality of types of musical scores to be respectively played by the plurality of types of musical instruments corresponding to the plurality of instrument sound signals. In FIGS. 4 and 5, musical score information data B is shown as an actual musical score for easy understanding. In the embodiment, the musical score information data B is a standard MIDI file (SMF) discussed earlier.

The model parameter preparation/storage section 104 prepares model parameters containing a plurality of parameters for respectively representing a plurality of types of single tones respectively produced from the plurality of types of musical instruments with a plurality of harmonic/inharmonic mixture models each including a harmonic model and an inharmonic model, and stores the model parameters in storage means 105. In order to prepare the model parameters, in the embodiment, a plurality of model parameters for a plurality of types of single tones are prepared by using a plurality of templates represented with a plurality of standard power spectrograms corresponding to the plurality of types of single tones (all single tones produced from each musical instrument) respectively produced by the plurality of types of musical instruments used in instrument parts contained in the musical score information data B.

The model parameter assembled data preparation/storage section 106 respectively replaces a plurality of single tones contained in the plurality of types of musical scores with a plurality of model parameters which are stored in the storage means 105 of the model parameter preparation/storage section 104 and which are formed to contain a plurality of parameters for respectively forming the harmonic/inharmonic mixture models. The model parameter assembled data preparation/storage section 106 then prepares a plurality of types of model parameter assembled data corresponding to the plurality of types of musical scores and formed by assembling the plurality of model parameters, and stores the plurality of types of model parameter assembled data in storage means 107.

In another embodiment to be described later, model parameters are prepared on the basis of template sounds obtained by converting musical score information data in a MIDI file into sounds with audio conversion means. As discussed earlier, a template sound is a sample of each single tone generated by a MIDI sound source on the basis of a musical score. A template is a plurality of types of single tones (a plurality of types of single tones at different pitches) that can be produced by a certain type of musical instrument respectively represented with standard power spectrograms. Respective templates for respective single tones are represented as power spectrograms which each have a time axis and a frequency axis and which are similar to a plurality of power spectrograms shown below the words "SEPARATED SOUNDS" shown at the output in FIG. 5, although no templates are shown in FIG. 5. For example, a template may be a sound of "do" produced from a standard guitar represented with a standard power spectrogram. The power spectrogram of a template of a single tone of "do" for the guitar is more or less similar to, but is not the same as, the power spectrogram of a single tone of "do" in an instrument sound signal for the guitar contained in the input audio signal.

A harmonic/inharmonic mixture model is defined, for a time t, a frequency f, a k-th musical instrument, and an l-th single tone, as the linear sum of a harmonic model $H_{kl}(t, f)$ representing a harmonic structure and an inharmonic model $I_{kl}(t, f)$ representing an inharmonic structure. A harmonic/inharmonic mixture model represents, with one model, the power spectrogram of a single tone containing both harmonic-structure and inharmonic-structure signal components. If the power spectrogram for a k-th musical instrument and an l-th single tone is defined as $J_{kl}(t, f)$, the harmonic/inharmonic mixture model can be represented as $J_{kl}(t, f)=H_{kl}(t, f)+I_{kl}(t, f)$. In the embodiment, the plurality of templates corresponding to the plurality of types of single tones are converted into the model parameters formed by the plurality of parameters for forming the harmonic/inharmonic mixture models. The model parameters are also called "tone models" of single tones. If the model parameters are visually represented as tone models, a plurality of charts shown below the words "SOUND MODELS" shown below the words "INTERMEDIATE REPRESENTATION" in FIG. 5 are obtained. The storage means 105 of the model parameter preparation/storage section 104 stores the plurality of model parameters respectively corresponding to the plurality of types of single tones for the plurality of types of musical instruments.

The storage means 107 of the model parameter assembled data preparation/storage section 106 stores model parameter assembled data $MPD_1$ to $MPD_k$ formed by assembling a plurality of model parameters ($MP_{1l}$ to $MP_{1l}$) to ($MP_{kl}$ to $MP_{kl}$) corresponding to a plurality of types of musical scores or musical instruments as shown in FIG. 4. FIG. 4 represents one model parameter as one sheet, which indicates that one single tone on a musical score is represented by one model parameter (tone model).

The first power spectrogram generation/storage section 108 reads a plurality of the model parameters ($MP_{1l}$ to $MP_{1l}$) to ($MP_{kl}$ to $MP_{kl}$) at each time from the plurality of types of model parameter assembled data $MPD_1$ to $MPD_k$ as shown in FIG. 4. The first power spectrogram generation/storage section 108 then generates a plurality of initial power spectrograms ($PS_{1l}$ to $PS_{1l}$) to ($PS_{kl}$ to $PS_{kl}$) corresponding to the read model parameters using the plurality of parameters respectively contained in the read model parameters and a predetermined first model parameter conversion formula, and stores the plurality of initial power spectrograms ($PS_{1l}$ to $PS_{1l}$) to ($PS_{kl}$ to $PS_{kl}$) in storage means 109.

The first model parameter conversion formula used by the first power spectrogram generation/storage section 108 may be the following harmonic/inharmonic mixture model:

$$h_{kl}=r_{klc}(H_{kl}(t,f)+I_{kl}(t,f))$$

In the above formula, $h_{kl}$ is a power spectrogram, and $r_{klc}$ is a parameter representing a relative amplitude in each channel. $H_{kl}(t, f)$ is a harmonic model formed by a plurality of parameters representing features including an amplitude, temporal changes in a fundamental frequency F0, a y-th Gaussian weighted coefficient representing a general shape of a power envelope, a relative amplitude of an n-th harmonic component, an onset time, a duration, and diffusion along a frequency axis. $I_{kl}(t, f)$ is an inharmonic model represented by a nonparametric function. The plurality of parameters of the harmonic model and the function of the inharmonic model are the plurality of parameters respectively contained in the model parameters.

Figure 6:
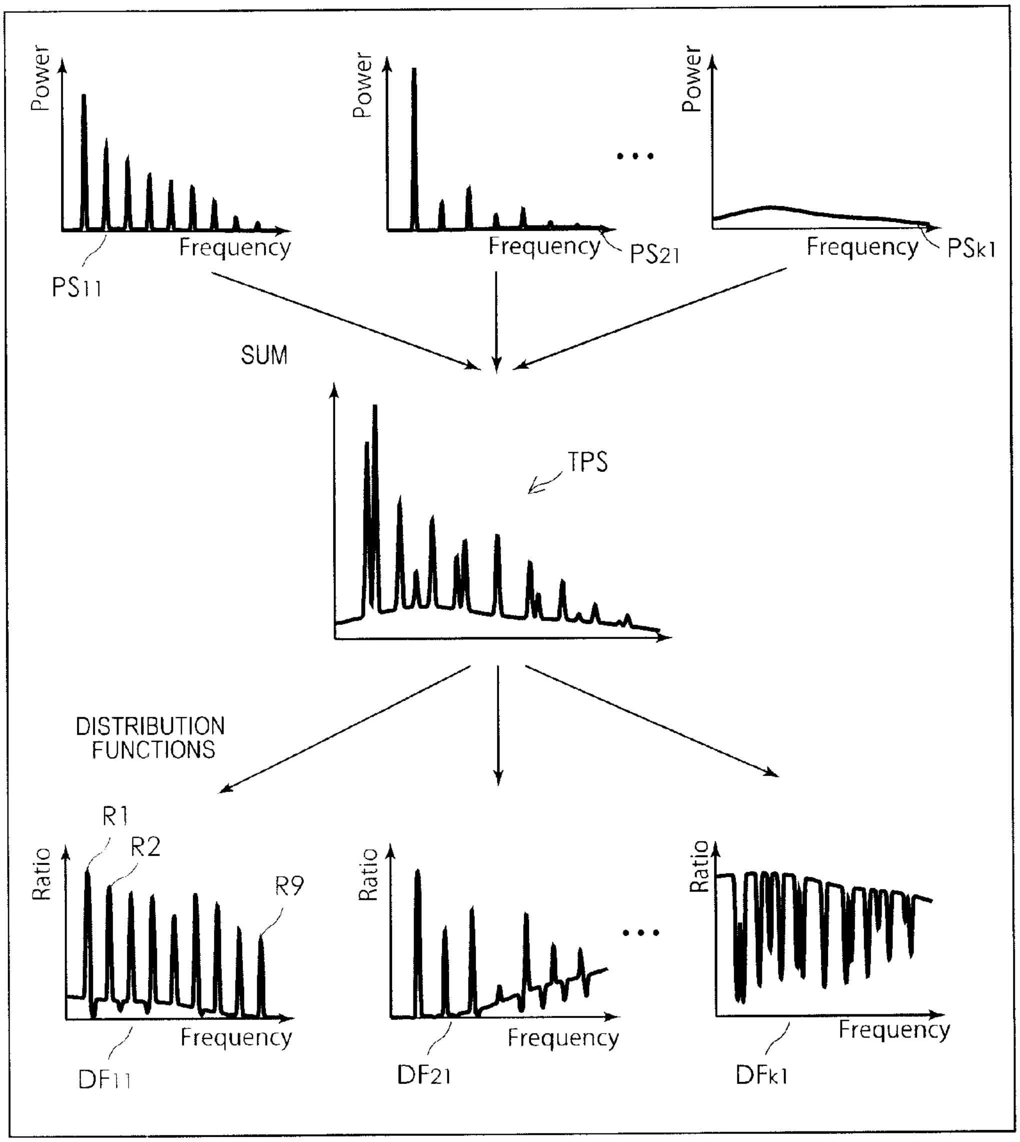
FIG. 6 is a diagram used to conceptually illustrate a method for obtaining distribution functions.

The initial distribution function computation/storage section 110 first synthesizes the plurality of initial power spectrograms (for example, $PS_{1l}$, $PS_{2l}$, . . . , $PS_{kl}$) stored in the storage means 109 of the first power spectrogram generation/storage section 108 at each time to prepare a synthesized power spectrogram TPS (for example, $PS_{1l}+PS_{2l}+\ldots+PS_{kl}$) at each time as shown in FIG. 6. The initial distribution function computation/storage section 110 then computes at each time a plurality of initial distribution functions ($DF_{1l}$ to $DF_{kl}$) indicating proportions (ratios) {for example, [$PS_{1l}$/TPS]} of the plurality of initial power spectrograms to the synthesized power spectrogram TPS at each time, and stores the plurality of initial distribution functions ($DF_{1l}$ to $DF_{kl}$) in storage means 111. In FIG. 4, an initial power spectrogram and an initial distribution function are shown in one sheet. The number of the plurality of initial distribution functions stored in the storage means 111 is equal to the number of the times (the maximum value of the number l of the single tones) multiplied by the number k of the musical instruments or the number of the types of musical scores. As shown in FIG. 6, the initial distribution functions include a plurality of proportions R1 to R9 for a plurality of frequency components contained in a power spectrogram.

Figure 7:
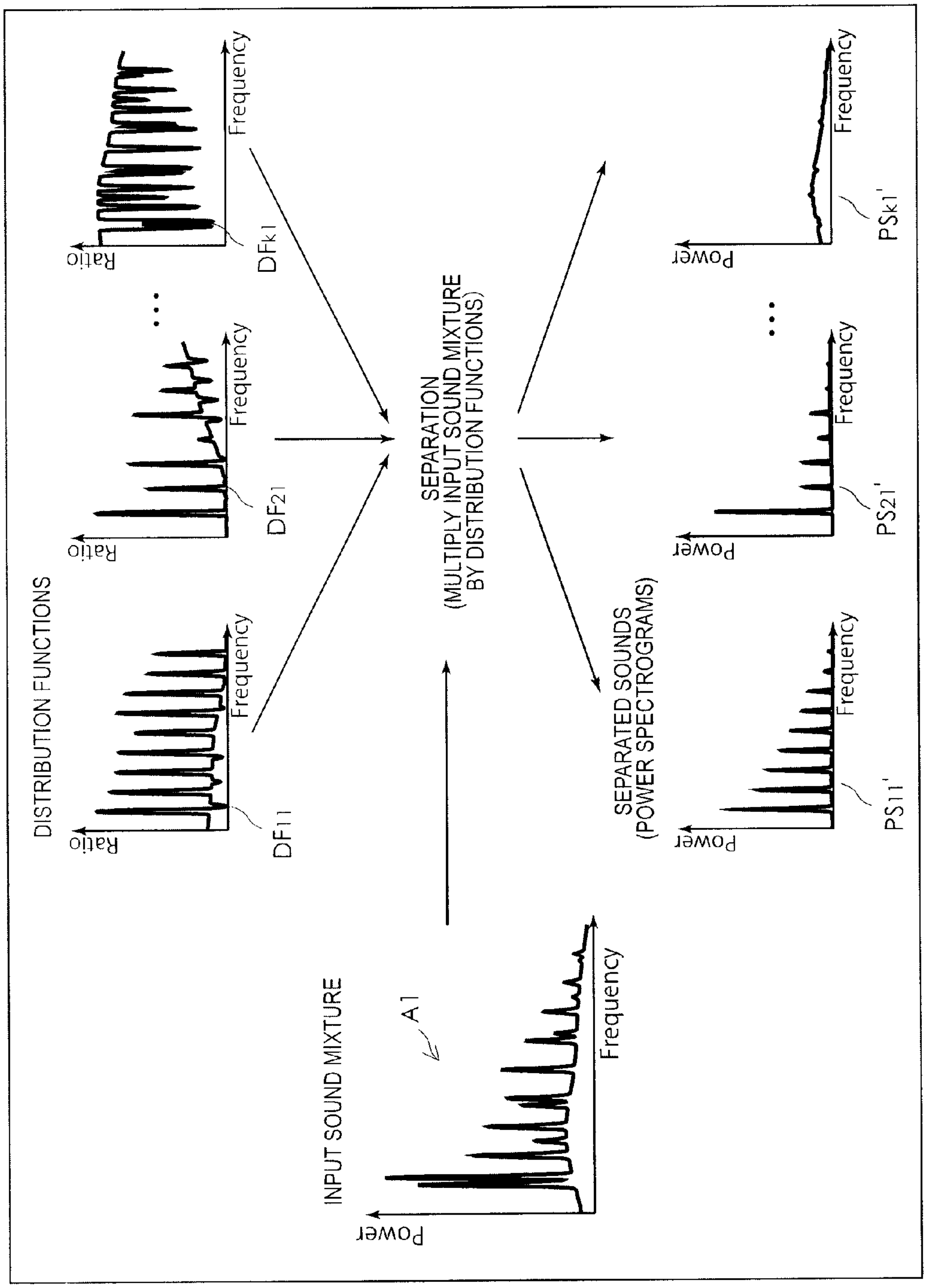
FIG. 7 is a diagram used to conceptually illustrate a separation process that uses the distribution functions.

The power spectrogram separation/storage section 112 separates a plurality of power spectrograms $PS_{1l'}$ to $PS_{kl'}$ corresponding to the plurality of types of musical instruments at each time from a power spectrogram A1 of the input audio signal at each time using the plurality of initial distribution functions (for example, $DF_{1l}$ to $DF_{kl}$) at each time, and stores the plurality of power spectrograms $PS_{1l'}$ to $PS_{kl'}$ in storage means 113 in a first separation process as shown in FIG. 7. That is, in the first separation process, the power spectrogram separation/storage section 112 separates the plurality of power spectrograms (power spectrograms of one single tone) $PS_{1l'}$ to $PS_{kl'}$ corresponding to the plurality of types of musical instruments at each time by multiplying the power spectrogram A1 of the input audio signal by the initial distribution functions (for example, $DF_{1l}$ to $DF_{kl}$) As will be described later, the power spectrogram separation/storage section 112 performs a power spectrogram separation process using updated distribution functions in second and subsequent separation processes.

The updated model parameter estimation/storage section 114 estimates a plurality of updated model parameters ($MP_{1l'}$ to $MP_{kl'}$), which contain a plurality of parameters necessary to represent the plurality of types of single tones with the harmonic/inharmonic mixture models, from the plurality of power spectrograms $PS_{1l'}$ to $PS_{kl'}$ separated at each time and corresponding to the plurality of types of musical instruments as shown in FIG. 4. In FIG. 4, a separated power spectrogram and an updated model parameter are shown in one sheet. The updated model parameter estimation/storage section 114 then prepares a plurality of types of updated model parameter assembled data $MPD_{1'}$ to $MPD_{k'}$ formed by assembling the plurality of updated model parameters, and stores the plurality of types of updated model parameter assembled data $MPD_{1'}$ to $MPD_{k'}$ in storage means 115. The estimation process performed by the updated model parameter estimation/storage section 114 will be described later. In FIG. 5, tone models represented by the first model parameters $MP_{1l}$ to $MP_{kl}$ or the updated model parameters $MP_{1l'}$ to $MP_{kl}$ are indicated as "INTERMEDIATE REPRESENTATION". In FIG. 5, estimation of the updated model parameters ($MP_{1l'}$ to $MP_{kl'}$) formed from the plurality of parameters from the plurality of power spectrogram data $PS_{1l'}$ to $PS_{kl'}$ separated at each time and corresponding to the plurality of types of musical instruments is indicated as "PARAMETER ESTIMATION".

Returning to FIG. 2, the second power spectrogram generation/storage section 116 reads the updated model parameters ($MP_{1l'}$ to $MP_{kl'}$) at each time from the plurality of types of updated model parameter assembled data stored in the storage means 115 of the updated model parameter estimation/storage section 114 to generate a plurality of updated power spectrograms ($PS_{1l''}$ to $PS_{kl''}$, not shown) corresponding to the read updated model parameters ($MP_{1l'}$ to $MP_{kl'}$) using the plurality of parameters contained in the read updated model parameters and a predetermined second model parameter conversion formula, and stores the plurality of updated power spectrograms ($PS_{1l''}$ to $PS_{kl''}$) in storage means 117. The second model parameter conversion formula may be the same as the first model parameter conversion formula.

The updated distribution function computation/storage section 118 computes updated distribution functions in the same way as the computation performed by the initial distribution function computation/storage section 110. That is, the updated distribution function computation/storage section 118 synthesizes the plurality of updated power spectrograms ($PS_{1l''}$ to $PS_{kl''}$, not shown) stored in the second power spectrogram generation/storage section 116 at each time to prepare a synthesized power spectrogram TPS at each time. The updated distribution function computation/storage section 118 then computes at each time the plurality of updated distribution functions ($DF_{1l'}$ to $DF_{kl'}$, not shown) indicating proportions (for example, $PS_{1l''}$/TPS) of the plurality of updated power spectrograms to the synthesized power spectrogram TPS at each time, and stores the plurality updated distribution functions ($DF_{1l'}$ to $DF_{kl'}$) in storage means 119. As with the initial distribution functions ($DF_{1l}$ to $DF_{kl}$), the updated distribution functions ($DF_{1l'}$ to $DF_{kl'}$) also allow distribution to be equally performed for both harmonic and inharmonic models forming power spectrograms.

Now, the estimation process performed by the updated model parameter estimation/storage section 114 is described. The updated model parameter estimation/storage section 114 is configured to estimate the plurality of parameters respectively contained in the plurality of updated model parameters ($MP_{1l'}$ to $MP_{kl'}$) such that the updated power spectrograms ($PS_{1l''}$ to $PS_{kl''}$, not shown) gradually change from a state close to the initial power spectrograms to a state close to the plurality of power spectrograms most recently stored in the storage means 113 of the power spectrogram separation/storage section 112 each time the power spectrogram separation/storage section 112 performs the separation process for the second or subsequent time. The power spectrogram separation/storage section 112, the updated model parameter estimation/storage section 114, the second power spectrogram generation/storage section 116, and the updated distribution function computation/storage section 118 repeatedly perform process operations until the updated power spectrograms ($PS_{1l''}$ to $PS_{kl''}$) change from the state close to the initial power spectrograms ($PS_{1l}$ to $PS_{kl}$) to the state close to the plurality of power spectrograms ($PS_{1l'}$ to $PS_{kl'}$) most recently stored in the storage means 113 of the power spectrogram separation/storage section 112. Thus, the final updated power spectrograms ($PS_{1l''}$ to $PS_{kl''}$) prepared on the basis of the updated model parameters ($MP_{1l'}$ to $MP_{kl'}$) of respective single tones are close to the power spectrograms of single tones of one musical instrument contained in the input audio signal formed to contain harmonic and inharmonic models.

As will be described in detail later, the updated model parameter estimation/storage section 114 preferably estimates the parameters of the updated model parameters using a cost function. Preferably, the cost function is a cost function J defined on the basis of a sum $J_0$ of all of KL divergences $J_1 \times \alpha$($\alpha$ is a real number that satisfies $0 \leqq \alpha \leqq 1$) between the plurality of power spectrograms ($PS_{1l'}$ to $PS_{kl'}$) at each time stored in the storage means 113 of the power spectrogram separation/storage section 112 and the plurality of updated power spectrograms ($PS_{1l''\ to\ PSkl''}$) at each time stored in the storage means 117 of the second power spectrogram generation/storage section 116 and KL divergences $J_2 \times (1-\alpha)$ between the plurality of updated power spectrograms ($PS_{1l''}$ to $PS_{kl''}$) at each time stored in the storage means 117 of the second power spectrogram generation/storage section 116 and the plurality of initial power spectrograms ($PS_{1l}$ to $PS_{kl}$) at each time stored in the storage means 119 of the first power spectrogram generation/storage section 108, and used each time the power spectrogram separation/storage section 112 performs the separation process, for example. The plurality of parameters respectively contained in the plurality of updated model parameters ($MP_{1l'}$ to $MP_{kl'}$) are estimated to minimize the cost function J. Thus, the updated model parameter estimation/storage section 114 is configured to increase $\alpha$ each time the separation process is performed. The power spectrogram separation/storage section 112, the updated model parameter estimation/storage section 114, the second power spectrogram generation/storage section 116, and the updated distribution function computation/storage section 118 repeatedly perform process operations until α becomes 1, thereby achieving sound source separation. Then, α is set to 0 when the power spectrogram separation/storage section 112 performs the first separation process. Particularly, by estimating the parameters contained in the updated model parameters ($MP_{1l'}$ to $MP_{kl'}$) in this way, the parameters contained in the updated model parameters ($MP_{1l'}$ to $MP_{kl'}$) may be reliably settled in a stable state.

FIG. 3 shows an exemplary algorithm of a computer program used, the above embodiment of the present invention in using a computer. In step S1 of the algorithm, musical score information data is prepared, the musical score information data being temporally synchronized with an input audio signal containing a plurality of instrument sound signals corresponding to a plurality of types of instrument sounds produced from a plurality of types of musical instruments, the musical score information data relating to a plurality of types of musical scores to be respectively played by the plurality of types of musical instruments corresponding to the plurality of instrument sound signals. In step S2, a plurality of model parameters are prepared. The plurality of model parameters are prepared in advance to represent a plurality of types of single tones respectively produced from the plurality of types musical instruments with a plurality of harmonic/inharmonic mixture models each including a harmonic model and an inharmonic model, and the plurality of model parameters contain a plurality of parameters for respectively forming the plurality of harmonic/inharmonic mixture models. Then, a plurality of types of model parameter assembled data $MPD_1$ to $MPD_k$ corresponding to the plurality of types of musical scores are prepared, by respectively replacing a plurality of single tones contained in the plurality of types of musical scores with the plurality of model parameters ($MP_{1l}$ to $MP_{1l}$) to ($MP_{kl}$ to $MP_{kl}$). The model parameter assembled data $MPD_1$ to $MPD_k$ are formed by assembling the plurality of model parameters ($MP_{1l}$ to $MP_{1l}$) to ($MP_{kl}$ to $MP_{kl}$) In step S3, a plurality of the model parameters at each time are read from the plurality of types of model parameter assembled data $MPD_1$ to $MPD_k$ to generate a plurality of initial power spectrograms $PS_{1l}$ to $PS_{kl}$ corresponding to the read model parameters ($MP_{1l}$ to $MP_{kl}$) using the plurality of parameters respectively contained in the read model parameters ($MP_{1l}$ to $MP_{kl}$) and a predetermined first model parameter conversion formula. In step S4, the plurality of initial power spectrograms are synthesized at each time to prepare a synthesized power spectrogram at each time. Then, a plurality of initial distribution functions ($DF_{1l}$ to $DF_{kl}$) indicating proportions of the plurality of initial power spectrograms to the synthesized power spectrogram at each time are computed at each time. In step S5, in a first separation process, a plurality of power spectrograms $PS_{1l'}$ to $PS_{kl'}$ corresponding to the plurality of types of musical instruments at each time are separated from a power spectrogram of the input audio signal at each time using the plurality of initial distribution functions ($DF_{1l}$ to $DF_{kl}$) at each time. Then, in second and subsequent separation processes, a plurality of power spectrograms corresponding to the plurality of types of musical instruments at each time are separated using a plurality of updated distribution functions ($DF_{1l'}$ to $DF_{kl'}$). In step S6, a cost function J for estimating a plurality of updated model parameters ($MP_{1l'}$ to $MP_{kl'}$) from the plurality of power spectrograms $PS_{1l'}$ to $PS_{kl'}$ separated at each time is determined, the plurality of updated model parameters ($MP_{1l'}$ to $MP_{kl'}$) containing a plurality of parameters necessary to represent the plurality of types of single tones with the harmonic/inharmonic mixture models. In step S7, the plurality of parameters respectively contained in the plurality of updated model parameters ($MP_{1l'}$ to $MP_{kl'}$) are estimated to minimize the cost function. In step S8, a plurality of types of updated model parameter assembled data $MPD_{1'}$ to $MPD_{k'}$ formed by assembling the plurality of updated model parameters ($MP_{1l'}$ to $MP_{kl'}$) are prepared. In the estimation of the first separation process, α is set to 0. The value of α increases in the second and subsequent separation processes. In step S9, Δα is added to α. The value of Δα is defined by how many times the separation process is performed. In order to improve the separation precision, Δα is preferably small. In step S10, a plurality of the updated model parameters ($MP_{1l'}$ to $MP_{kl'}$) at each time are read from the plurality of types of updated model parameter assembled data to generate a plurality of updated power spectrograms ($PS_{1l'}$ to $PS_{kl'}$) corresponding to the read updated model parameters ($MP_{1l'}$ to $MP_{kl'}$) using the plurality of parameters contained in the read updated model parameters ($MP_{1l'}$ to $MP_{kl'}$) and a predetermined second model parameter conversion formula. In step S11, the plurality of updated power spectrograms ($PS_{1l''}$ to $PS_{kl''}$) are synthesized at each time to prepare a synthesized power spectrogram at each time, and the plurality of updated distribution functions ($DF_{1l'}$ to $DF_{kl'}$) indicating proportions of the plurality of updated power spectrograms ($PS_{1l''}$ to $PS_{kl''}$) to the synthesized power spectrogram at each time are computed at each time. In step S12, it is determined whether or not α is 1. If α is not 1, the process jumps to step S5. The step S5 of separating the power spectrogram, the steps S6 to S9 of estimating the updated model parameter, the step S10 of generating the updated power spectrogram, and the step S11 of computing the updated distribution function are repeatedly performed until the updated power spectrograms change from the state close to the initial power spectrograms to the state close to the plurality of power spectrograms most recently separated in the step of separating the power spectrogram. The process is terminated when α becomes 1.

Factors utilized to implement the system and the method for sound source separation according to the embodiment of the present invention are described in detail in (1) to (4) below.

(1) Utilization of Musical Score Information

In a broad sense, sound source separation is defined as estimating and separating combination of sound sources (instrument sound signals) forming audio signals contained in a sound mixture. Fundamentally, sound source separation includes a step of separating and extracting sound sources (instrument sound signals) from a sound mixture, and a sound source estimation step of estimating what musical instruments correspond to the separated sound sources (instrument sound signals). The latter step belongs to a field called "instrument sound recognition technology". The instrument sound recognition technology is implemented by estimating sound sources used in a musical piece played, for example a piano, flute, and violin trio, given an ensemble audio signal as an input signal.

Currently, however, the instrument sound recognition technology has not been matured very much yet. Even the most recent study recognizes a sound mixture for a chord of at most four tones, all with a harmonic structure. Instrument sound recognition becomes more difficult as the number of sound sources increases.

Thus, in order to improve the precision of sound source separation, the present invention requires a precondition that musical score information containing information on instrument labels and notes for respective instrument parts (hereinafter referred to as "musical score information data") be provided in advance. The use of musical score information as a prior knowledge enables sound source separation in which various constraints are considered as will be discussed later.

(2) Formulation of Harmonic/Inharmonic Mixture Model

A "harmonic/inharmonic mixture model $h_{kl}$" (power spectrogram) obtained by integrating harmonic and inharmonic model s for a time t, a frequency f, a k-th musical instrument, and an l-th single tone is defined as the linear sum of a model $H_{kl}(t, f)$ representing a harmonic structure and a model $I_{kl}(t, f)$ representing an inharmonic structure by the following formula (1):

[Expression 1]

$$h_{kl}==r_{klc}(H_{kl}(t,f)+I_{kl}(t,f)) \tag{1}$$

In the above formula (1), $r_{klc}$ is a parameter representing a relative amplitude in each channel, and satisfies the following condition:

[Expression 2]

$$\sum_{c} r_{klc} = 1$$

In the above formula (1), the harmonic model $H_{kl}(t, f)$ is defined on the basis of a parametric model (a model represented by parameters) representing the harmonic structure of a pitched instrument sound. That is, the harmonic model $H_{kl}(t, f)$ is represented by parameters representing features such as temporal changes in an amplitude and a fundamental frequency (F0), an onset time, a duration, a relative amplitude of each harmonic component, and temporal changes in a power envelope.

In the present embodiment, a harmonic model is constructed on the basis of a plurality of parameters used in a sound source model (hereinafter referred to as "HTC sound source model") used in Harmonic-Temporal-structured Clustering (HTC). Because the trajectory $\mu_{kl}(t)$ of the fundamental frequency F0 is defined as a polynomial of the time t, however, such a sound source model cannot flexibly handle temporal changes in the pitch. Thus, in the present embodiment, in order to handle temporal changes in the pitch more flexibly, the HTC sound source model is modified to satisfy the formulas (2) to (4) below, to increase the degree of freedom by defining the trajectory $\mu_{kl}(t)$ as a nonparametric function:

[Expression 3]

$$H_{kl} = \sum_{y=0}^{Y-1} \sum_{n=1}^{N} w_{kl} E_{kly} F_{kln} \tag{2}$$

$$E_{kly} = \frac{u_{kly}}{\sqrt{2\pi}\,\phi_{kl}} e^{-\frac{(t-\tau_{kl}-y\phi_{kl})^2}{2\phi_{kl}^2}} \tag{3}$$

$$F_{kln} = \frac{v_{kln}}{\sqrt{2\pi}\,\phi_{kl}} e^{-\frac{(f-n\mu_{kl}(t))^2}{2\sigma_{kl}^2}} \tag{4}$$

In the formula (2), $w_{kl}$ is a parameter representing the weight of a harmonic component, $\Sigma E_{kly}$ represents temporal changes in a power envelope, and $\Sigma F_{kln}$ represents each time or the harmonic structure at each time. $E_{kly}$ and $F_{kly}$ are respectively represented by the above formulas (3) and (4). Although $\Sigma E_{kly}$ and $\Sigma F_{kly}$ should be respectively represented as $\Sigma E_{kly}(t)$ and $\Sigma F_{kly}(t)$ "(t)" is not shown for convenience.

Parameters of the above harmonic model are listed in Table 1. The plurality of parameters listed in Table 1 are main examples of the plurality of parameters forming model parameters and updated model parameters to be discussed later.

TABLE 1

Parameters of harmonic model

| Symbol | Description |
|---|---|
| $w_{kl}$ | Overall amplitude of harmonic-structure model |
| $\mu_{kl}(t)$ | F0 trajectory |
| $u_{kly}$ | y-th gaussian weighted coefficient representing general shape of power envelope, which satisfy $\Sigma_y u_{kly} = 1$ |
| $v_{kln}$ | Relative amplitude of n-th harmonic component, which satisfies $\Sigma_n V_{kln} = 1$ |
| $\tau_{kl}$ | Onset time |
| $Y_{\phi kl}$ | Duration (Y is constant) |
| $\sigma_{kl}$ | Diffusion along frequency axis |

Meanwhile, the inharmonic model is defined as a nonparametric function. Therefore, the inharmonic model is directly represented with a power spectrogram. The inharmonic model represents inharmonic sounds (sounds for which individual frequency components cannot be clearly identified in a power spectrogram) such as sounds produced from the bass drum and the snare drum. Even instrument sounds with a harmonic structure such as sounds produced from the piano and the guitar may contain an inharmonic component at the time of sound production such as a sound of striking a string with a hammer and a sound of bowing a string as discussed above. Thus, in the present embodiment, such an inharmonic component is also represented with an inharmonic model.

In the present embodiment, it is necessary to desirably settle model parameters containing the plurality of parameters forming a harmonic/inharmonic mixture model formulated as described above. In other words, in order to estimate model parameters containing the plurality of parameters forming a harmonic/inharmonic mixture model corresponding to all single tones in each instrument part, in the present embodiment, the following constraints are imposed on a cost function [a function indicated by the formula (21) to be described later] which is used to estimate the plurality of parameters contained in the model parameters as described below and which will be discussed later.

(3) Establishment of Various Constraints on Model Parameters of Harmonic/Inharmonic Mixture Model In the present embodiment, the constraints to be imposed on the model parameters are roughly divided into three types. The constraints indicated below can each be a factor to be added to the cost function J [formula (21)] to be discussed later to increase the total cost. The constraints act against minimizing the cost function J.

[First Constraint]: Constraint on Continuity of Fundamental Frequency F0

As discussed above, the harmonic model contained in a harmonic/inharmonic mixture model of the formula (2) is defined to contain a nonparametric function $\mu_{kl}(t)$ in order to flexibly handle temporal changes in the pitch. This may result in a problem that the fundamental frequency F0 varies temporally discontinuously.

In order to solve the problem, it is preferable to impose on the cost function J [formula (21)] to be described later a constraint for prohibiting discontinuous variations in the fundamental frequency F0 under certain conditions, specifically, a constraint given by the following formula (5):

[Expression 4]

$$\beta_\mu \int \left( \bar{\mu}_{kl}(t) \log \frac{\bar{\mu}_{kl}(t)}{\mu_{kl}(t)} - (\bar{\mu}_{kl}(t) - \mu_{kl}(t)) \right) dt \tag{5}$$

In the formula (5), $\beta_\mu$ is a coefficient. A function represented by μ topped with a hyphen (-) (hereinafter referred to as "$\mu\text{-}_{kl}(t)$" in the above formula is obtained by smoothening $\mu_{kl}(t)$ in the time direction with a Gaussian filter in updating the fundamental frequency F0, and acts to smoothen the current F0 in the frequency direction. This constraint acts to bring $\mu_{kl}(t)$ closer to $\mu\text{-}_{kl}(t)$. Discontinuous variations in the fundamental frequency mean great variations at a shift of the fundamental frequency F0.

[Second Constraint]: Constraint on Inharmonic Model

The inharmonic model contained in a harmonic/inharmonic mixture model of the formula (2) discussed above is directly represented with an input power spectrogram. Therefore, the inharmonic model has a very great degree of freedom. As a result, if a harmonic/inharmonic mixture model is used, many of a plurality of power spectrograms separated from an input power spectrogram may be represented with only an inharmonic model. That is, after the process of repeated estimation of updated model parameter to be described later in the formula (4), there may be the problem that instrument sound signals indicating a plurality of instrument sounds contained in a sound mixture and containing a harmonic model are represented with an inharmonic model.

Thus, in order to solve the problem, it is preferable to impose on the cost function J [formula (21)] to be described later a constraint given by the following formula (6):

[Expression 5]

$$\beta_{I2} \int \int \left( \bar{I}_{kl} \log \frac{\bar{I}_{kl}}{I_{kl}} - (\bar{I}_{kl} - I_{kl}) \right) dt\, df \tag{6}$$

In the above formula, $\beta_{I2}$ is a coefficient. A function represented by I topped with a hyphen (-) in the above formula is hereinafter referred to as "$I\text{-}_{kl}$". The function is obtained by smoothening $I\text{-}_{kl}$ in the frequency direction with a Gaussian filter. This constraint acts to bring $I_{kl}$ closer to $I\text{-}_{kl}$. Such a constraint eliminates the possibility that a harmonic/inharmonic mixture model is represented with only an inharmonic model.

[Third Constraint]: General Constraint on Harmonic/Inharmonic Mixture Model (Constraint on Consistency in Timbre between Identical Musical Instruments)

Audio signals for a certain musical instrument may be different from each other, even if they are represented with the same fundamental frequency F0 and duration on a musical score, because of playing styles, vibrato, or the like. Therefore, it is necessary to model each single tone using a harmonic/inharmonic mixture model (represent each single tone with model parameters including a plurality of parameters). If a sound produced from a certain musical instrument is compared with other sounds (instrument sounds) produced from the same musical instrument, however, it is found that a plurality of sounds produced from the same musical instrument have some consistency (that is, a plurality of sounds produced from the same musical instrument have similar properties). If each single tone is modeled, however, such properties cannot be represented. In other words, it is necessary that the plurality of parameters forming the updated model parameters estimated from a power spectrogram obtained by performing a separation process satisfy a condition relating to the consistency between a plurality of sounds produced from the same musical instrument, that a plurality of sounds produced from the same musical instrument are similar to each other and that respective single tones are slightly different from each other.

Thus, in order to impose on both the harmonic and inharmonic models a constraint for maintaining the consistency and permitting slight differences between a plurality of instrument sounds produced from performance by an identical musical instrument, it is preferable to add formulas described below to the cost function J [formula (21)] to be described later.

(3-1: Constraint on Harmonic Model Between Plural Tone Models from Identical Musical Instrument)

A specific example of a constraint on a harmonic model between identical musical instruments is given by the following formula (7):

[Expression 6]

$$\beta_v \sum_n \left( \bar{v}_{kn} \log \frac{\bar{v}_{kn}}{v_{kln}} - (\bar{v}_{kn} - v_{kln}) \right) \tag{7}$$

In the above formula, $\beta_v$ is a coefficient. A function represented by v topped with a hyphen (-) is hereinafter referred to as "$v\text{-}_{kn}$". The function $v\text{-}_{kn}$ is obtained by averaging the relative amplitudes $v_{kln}$ n-th harmonic components for a plurality of tone models produced from an identical musical instrument. This constraint acts to approximate the relative amplitudes of harmonic components for a plurality of single tones produced from one musical instrument to each other.

(3-2: Constraint on Inharmonic Model Between Plural Tone Models from Identical Musical Instrument)

A specific example of a constraint on a inharmonic model for a plurality of tone models for an identical musical instrument is given by the following formula (8):

[Expression 7]

$$\beta_{I1} \int \int \left( \bar{I}_k \log \frac{\bar{I}_k}{I_{kl}} - (\bar{I}_k - I_{kl}) \right) dt\, df \tag{8}$$

In the above formula, $\beta_{I1}$ is a coefficient. A function represented by I topped with a hyphen (-) is hereinafter referred to as "$I\text{-}_k$". The function is obtained by averaging the $I_{kl}$'s of a plurality of tone models for an identical musical instrument. This constraint acts to approximate the inharmonic components for a plurality of single tones produced from an identical musical instrument (or a plurality of tone models for a plurality of single tones) to each other.

(4) Model Parameter Repeated Estimation Process

Under the above first to third constraints, a process (referred to as "separation process") for decomposing a power spectrogram $g^{(O)}(c, t, f)$ to be observed (the power spectrogram of an input audio signal) into a plurality of power spectrograms corresponding to a plurality of single tones is performed in order to convert the power spectrogram to be observed (the power spectrogram of an input audio signal) into model parameters forming the harmonic/inharmonic mixture model represented by the formula (2). In order to perform the process, a distribution function $m_{kl}(c, t, f)$ of a power spectrogram is introduced. Hereinafter, the power spectrogram) $g^{(O)}(c, t, f)$ and the distribution function $m_{kl}(c, t, f)$ are occasionally simply referred to as $g^{(O)}$ and $m_{kl}$, respectively. In the present invention, distribution functions used in a first separation process are called "initial distribution functions", and distribution functions used in second and subsequent separation processes are called "updated distribution functions".

The symbol c represents the channel, for example left or right, t represents the time, and f represents the frequency. The letter "k" added to each symbol represents the number k of the musical instrument ($1 \leqq k \leqq K$), and the letter "l" represents the number of the single tone ($1 \leqq l \leqq L$). In the present embodiment, there are no restrictions on the number of channels in an input signal or the number of single tones produced at the same time. That is, the power spectrogram $g^{(O)}$ to be observed includes all the power spectrograms of performance by K musical instruments with each musical instrument having $L_k$ single tones. The power spectrogram (template) of a template sound for a k-th musical instrument and an l-th single tone is represented as $g_{kl}^{(T)}(t, f)$, and the power spectrogram of the corresponding single tone is represented as $h_{kl}(c, t, f)$ [hereinafter the power spectrogram $g_{kl}^{(T)}(t, f)$ of a template sound is represented as $g_{kl}^{(T)}$, and the tone model $h_{kl}(c, t, f)$ is represented as $h_{kl}$]. Because information on the localization according to the musical score information data provided in advance does not necessarily coincide with the localization in an audio signal, $g_{kl}^{(T)}$ has one channel.

Figure 8:
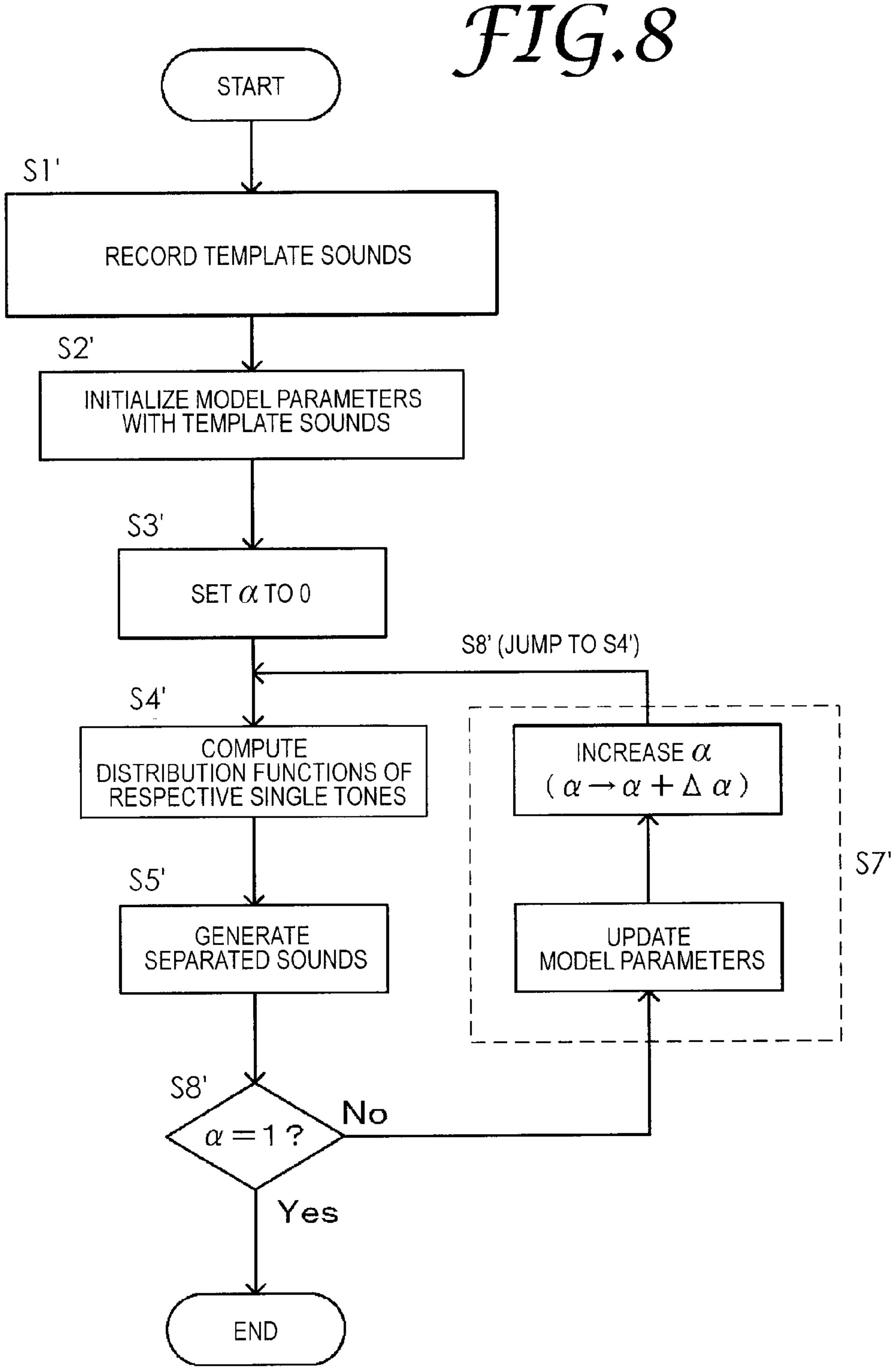
FIG. 8 is a flowchart roughly showing exemplary procedures of a model parameter repeated estimation process adopted in the present invention.

FIG. 8 is a flowchart roughly showing exemplary procedures of a model parameter repeated estimation process adopted in the present invention. In this embodiment unlike the foregoing embodiment, a plurality of templates of a plurality of single tones produced from each musical instrument represented with power spectrograms are prepared from a plurality of template sounds.

(S1') First, information including at least the pitch, onset time, duration or offset time, and instrument label of each single tone is extracted from musical score information data provided in advance, and the musical information provided in advance is converted by audio conversion means into an audio signal to record all single tones as template sounds (that is, to "record template sounds").

(S2') A plurality of templates for all the single tones represented with power spectrograms are prepared from the template sounds. The plurality of templates are replaced with model parameters forming harmonic/inharmonic mixture models to prepare model parameter assembled data formed by assembling the plurality of model parameters. The process is referred to as "initialize model parameters with template sounds". A plurality of initial distribution functions are computed at each time on the basis of the plurality of model parameters at each time read from the model parameter assembled data.

(S3') A plurality of power spectrograms corresponding to the plurality of single tones at each time are separated from a power spectrogram of the input audio signal using the plurality of initial distribution functions at each time. The separation process is executed by multiplying the power spectrogram of the input audio signal by the initial distribution functions. Then, updated model parameters are estimated from the plurality of power spectrograms separated at each time. KL divergence $J_1$ is defined as the closeness between the plurality of updated power spectrograms prepared from the plurality of updated model parameters generated from the power spectrograms of the separated sounds and the plurality of power spectrograms separated from the power spectrogram of the input audio signal. KL divergence $J_2$ is defined as the closeness between the plurality of initial power spectrograms prepared from the model parameter assembled data prepared first on the basis of the template sounds and the updated power spectrograms. The KL divergence $J_1$ and the KL divergence $J_2$ are weighted with a ratio of $\alpha:(1-\alpha)$ ($\alpha$ is a real number that satisfies $0 \leqq \alpha \leqq 1$), and are then added together to be defined as a current cost function. Thus, the initial value of $\alpha$ is set to 0.

(S4') A plurality of updated distribution functions are computed at each time from the updated power spectrograms.

(S5') A separation process is executed using the updated distribution functions.

(S6') It is determined whether or not $\alpha$ is equal to 1, and if $\alpha$ is equal to 1, the process is terminated.

(S7') If $\alpha$ is not equal to 1 in S6', the updated model parameters are estimated from the separated power spectrograms (the model parameters are updated) using the cost function while increasing $\alpha$ by $\Delta\alpha$.

(S8') The process jumps to step S4'.

In the embodiment, template sounds are utilized as the initial values of the model parameters, and initial distribution functions are prepared on the basis of initial power spectrograms generated from the obtained model parameters. First separated sounds are generated from the initial distribution functions. In order to improve the separation precision of the separated sounds (or evaluate the quality of the separated sounds), overfitting of the model parameters is prevented by first estimating the updated power spectrograms to be close to the templates and then gradually approximating the updated power spectrograms to the separated power spectrograms while repeatedly performing separations and model adaptations. This is achieved by weighting the closeness $J_1$ between the power spectrograms of the separated sounds and the updated power spectrograms obtained after converting the separated sounds into updated model parameters and the closeness $J_2$ between the initial power spectrograms obtained from the initial model parameters and the updated power spectrograms with a, and gradually increasing a from its initial value 0 to 1.

In the embodiment, an appropriate constraint indicated by the item (3) is set on the model parameters to desirably settle the updated model parameters, and under such a constraint, model adaptation (model parameter repeated estimation process) indicated by the item (4) is performed.

The sequence of steps (steps (S1') to (S8')) of repeatedly performing separations and model adaptations discussed above is nothing other than optimizing the distribution function $m_{kl}$ and the parameters of the power spectrogram $h_{kl}$ represented with a harmonic/inharmonic mixture model, and thus can be considered as an EM algorithm based on Maximum A Posteriori estimation. That is, derivation of the distribution functions $m_{kl}$ is equivalent to the E (Expectation) step in the EM algorithm, and updating of the updated model parameters forming the harmonic/inharmonic mixture model $h_{kl}$ is equivalent to the M (Maximization) step.

This is made clear by considering a Q function defined by the following formula (9):

[Expression 8]

$$Q(\theta, \tilde{\theta}) = \alpha \sum_{k,l,c} \int\int p(k, l \mid c, t, f, \theta) p(c, t, f) \log p(k, l, c, t, f \mid \tilde{\theta}) dt df + (1-\alpha) \sum_{k,l,c} \int\int p(k, l, t, f) \log p(k, l, c, t, f \mid \tilde{\theta}) dt df \quad (9)$$

The Q function is equivalent to a cost function JO, and respective probability density functions correspond to the functions $g^{(O)}$, $g_{kl}^{(T)}$, $h_{kl}$, and $m_{kl}$ as indicated in Table 2.

TABLE 2

Correlation between probability density functions and power spectrograms

| Probability density function | Description | Power spectrogram |
|---|---|---|
| p (c, l, f) | Observed probability density | $g^{(o)}$ |
| p (k, l, t, f) | Prior probability density | $g^{(T)}{}_{kl}$ |
| p (k, l, c, t, f\|θ) | Complete data | $h_{kl}$ |
| p (k, l\|c, t, f, θ) | Incomplete data | $m_{kl}$ |

It is necessary to normalize the power spectrograms such that the results of integrating each function with respect to all the variables become 1.

When the formula (10) below is considered, it is found that derivation of a distribution function with the formula (17) to be discussed later is also valid on the probability density functions. As is found from the formula (10), derivation of p(k, l|c, t, f, θ) (that is, $m_{kl}$) is equivalent to computation of a conditional expected value for the likelihood of complete data. That is, the derivation is equivalent to the E (Expectation) step of the EM algorithm. Also, updating of θ (that is, $h_{kl}$) is equivalent to maximization the Q function with respect to θ, and hence equivalent to the M (Maximization) step.

[Expression 9]

$$p(k, l \mid c, t, f, \theta) = \frac{p(k, l, c, t, f \mid \theta)}{\sum_{k,l} p(k, l, c, t, f \mid \theta)} \tag{10}$$

A calculation method used in the model parameter estimation process is specifically described below using formulas.

A distribution function $m_{kl}$(c, t, f) of a power spectrogram utilized to estimate parameters of model parameters respectively forming respective harmonic/inharmonic mixture models $h_{kl}$ from the power spectrogram) $g^{(O)}$ of an input audio signal to be observed in order to separate power spectrograms equivalent to single tones respectively represented by the model parameters represents the proportion of an l-th single tone produced from a k-th musical instrument to the power spectrogram $g^{(O)}$. Thus, the separated power spectrogram of the l-th single tone produced from the k-th musical instrument is obtained by computing a product) $g^{(O)} \cdot m_{kl}$ of the power spectrogram of the input audio signal and the distribution function. Assuming the additivity of power spectrograms, the distribution function $m_{kl}$ satisfies the following relationship:

$$0 \le m_{kl} \le 1, \quad \sum_{k,l} m_{kl} = 1 \qquad \text{[Expression 10]}$$

In order to evaluate the quality of the separation performed by the distribution function, a KL divergence (relative entropy) $J_1$(k, l) between the power spectrograms of all the separated single tones obtained by the product $g^{(O)} \cdot m_{kl}$ and all the updated power spectrograms $h_{kl}$ is used [see the formula (11)].

[Expression 11]

$$J_1(k, l) = \sum_c \int\int g^{(O)} m_{kl} \log \frac{g^{(O)} m_{kl}}{h_{kl}} \, dt\, df \tag{11}$$

In order to evaluate the quality of the estimated updated model parameters, in addition, a KL divergence $J_2$(k, l) between the initial power spectrograms prepared from the initial model parameters obtained from the template sounds $g_{kl}^{(T)}$ and the updated power spectrograms ($h_{kl}$) prepared from the updated model parameters is used [see the formula (12)].

[Expression 12]

$$J_2(k, l) = \sum_c \int\int g_{kl}^{(T)} \log \frac{g_{kl}^{(T)}}{h_{kl}} \, dt\, df \tag{12}$$

In order to evaluate the quality of the entirety obtained by integrating separations and model adaptations for all musical instruments and all single tones, further, a sum $J_0$ obtained by adding the KL divergences for all k's and all l's is used [see the formula (13)]. A cost function J [formula (21)] based on the sum $J_0$ is used to estimate the plurality of parameters forming the updated model parameters.

[Expression 13]

$$J_0 = \sum_{k,l} (\alpha J_1(k, l) + (1 - \alpha) J_2(k, l)) \tag{13}$$

The symbol α(0≦α≦1) is a parameter representing which of the separation and the model adaptation is to be emphasized. The value of α is first set to 0 (that is, the power spectrogram prepared from the model parameters is initially the initial power spectrogram based on the template sounds), and gradually approximated to 1 (that is, the updated power spectrogram is approximated to the power spectrogram separated from the input audio signal).

Separation and model adaptation are repeatedly performed by alternately performing one of estimation of the distribution function $m_{kl}$ and updating of the power spectrogram ($h_{kl}$) with the other fixed. Defining λ as a Lagrange undetermined multiplier and $J_0$ as a cost function $J_0$ to be minimized, the cost function $J_0$ is now represented by the following formula (14):

[Expression 14]

$$J_0 = \alpha \sum_{k,l,c} \int\int g^{(O)} m_{kl} \log \frac{g^{(O)} m_{kl}}{h_{kl}} \, dt\, df + (1 - \alpha) \sum_{k,l,c} \int\int g_{kl}^{(T)} \log \frac{g_{kl}^{(T)}}{h_{kl}} \, dt\, df - \lambda \left( \sum_{k,l} m_{kl} - 1 \right) \tag{14}$$

First, in order to perform separation, the distribution function $m_{kl}$ which minimizes the sum $J_0$ is obtained with the power spectrogram ($h_{kl}$) fixed. When $J_0$ is partially differentiated, the following equations (15) are obtained:

[Expression 15]

$$\begin{cases} \frac{\partial J_0}{\partial m_{kl}} = \alpha g^{(O)} \log \frac{g^{(O)} m_{kl}}{h_{kl}} - \lambda \\ \frac{\partial J_0}{\partial \lambda} = \sum_{k,l} m_{kl} - 1 \end{cases} \tag{15}$$

Using these equations, the following simultaneous equations are solved:

[Expression 16]

Then, the following formula is obtained:

$$\frac{\partial J_0}{\partial m_{kl}} = 0, \quad \frac{\partial J_0}{\partial \lambda} = 0 \tag{16}$$

[Expression 17]

$$m_{kl} = \frac{h_{kl}}{\sum_{k,l} h_{kl}} \tag{17}$$

Next, in order to perform model adaptation, the harmonic/inharmonic mixture model ($h_{kl}$) which minimizes the cost function J is obtained with the distribution function $m_{kl}$ fixed, thereby minimizing the cost function J.

The cost function J is considered as a cost for all single tones. As is clear from the formula (1) and the condition indicated by the [Expression 2] discussed earlier, the model of the entire power spectrogram of the input audio signal to be observed is the linear sum of the respective single tones. Each Lone model is the linear sum of harmonic and inharmonic models. A harmonic model is represented by the linear sum of base functions. Thus, the model parameters can be analytically optimized by decomposing the entire power spectrogram of the input audio signal to be observed into a Gaussian distribution function (equivalent to a harmonic model) and an inharmonic model of each single tone.

Two new distribution functions $m_{klyn}^{(H)}(t, f)$ and $m_{kl}^{(I)}(t, f)$ for power spectrograms are introduced. The functions respectively distribute the separated power spectrogram of an l-th single tone produced from a k-th musical instrument to a Gaussian distribution function (equivalent to a harmonic model) with a {y, n} label and an inharmonic model.

The following formulas are satisfied:

[Expression 18]

$$\begin{cases} \sum_{y,n} m_{klyn}^{(H)}(t, f) + m_{kl}^{(I)}(t, f) = 1 \\ 0 \le m_{klyn}^{(H)}(t, f) \le 1 \\ 0 \le m_{kl}^{(I)}(t, f) \le 1 \end{cases} \tag{18}$$

When the distribution functions which minimize the cost function J are derived with the power spectrogram ($h_{kl}$) of the harmonic/inharmonic mixture model fixed, the following equations are obtained:

[Expression 19]

$$\begin{cases} m_{klyn}^{(H)} = \frac{w_{kl} E_{kly} F_{kln}}{H_{kl} + I_{kl}} \\ m_{kl}^{(I)} = \frac{I_{kl}}{H_{kl} + I_{kl}} \end{cases} \tag{19}$$

Although not specifically described, the equations can be derived in a process similar to the derivation process for the distribution function $m_{kl}$ discussed earlier.

Given that λr, λu, and λv are respective Lagrange undetermined multipliers for $r_{klc}$, $r_{kly}$, and $\lambda_{kln}$, the following equations are given:

[Expression 20]

$$\begin{cases} G_{kl}(c, t, f) = \alpha g^{(O)} m_{kl} + (1-\alpha) g_{kl}^{(T)} \\ G_{klyn}^{(H)}(c, t, f) = m_{klyn}^{(H)} G_{kl}(c, t, f) \\ G_{kl}^{(I)}(c, t, f) = m_{kl}^{(I)} G_{kl}(c, t, f) \end{cases} \tag{20}$$

Then, the update equations for each parameter of the harmonic/inharmonic mixture model ($h_{kl}$) of each single tone can be obtained from the cost function J of the following formula (21):

[Expression 21]

$$\begin{aligned} J = & \sum_{k,l} \Bigg( \sum_{c,y,n} \int\int \left( G_{klyn}^{(H)} \log \frac{G_{klyn}^{(H)}}{r_{klc} w_{kl} E_{kly} F_{kln}} - G_{klyn}^{(H)} + r_{klc} w_{kl} E_{kly} F_{kln} \right) dt \\ & df + \sum_{c} \int\int \left( G_{kl}^{(I)} \log \frac{G_{kl}^{(I)}}{r_{klc} I_{kl}} - G_{kl}^{(I)} + r_{klc} I_{kl} \right) dt\, df + \\ & \beta_v \sum_n \left( \bar{v}_{kn} \log \frac{\bar{v}_{kn}}{v_{kln}} - \bar{v}_{kn} + v_{kln} \right) + \\ & \beta_\mu \int \left( \bar{\mu}_{kl}(t) \log \frac{\bar{\mu}_{kl}(t)}{\mu_{kl}(t)} - \bar{\mu}_{kl}(t) + \mu_{kl}(t) \right) dt + \\ & \beta_{I1} \int\int \left( \bar{I}_k \log \frac{\bar{I}_k}{I_{kl}} - \bar{I}_k + I_{kl} \right) dt\, df + \\ & \beta_{I2} \int\int \left( \bar{I}_{kl} \log \frac{\bar{I}_{kl}}{I_{kl}} - \bar{I}_{kl} + I_{kl} \right) dt\, df - \\ & \lambda_r \left( \sum_c r_{klc} - 1 \right) - \lambda_u \left( \sum_y u_{kly} - 1 \right) - \lambda_v \left( \sum_n v_{kln} - 1 \right) \Bigg) \end{aligned} \tag{21}$$

That is, it is possible to derive each formula that updates (estimates) the parameters forming the updated model parameters to minimize the cost function by obtaining a point at which a partial derivative of the cost function J with respect to each parameter is zero. A method for deriving such a formula is known, and is not specifically described here. In the cost function J of the formula (21), the first two terms are equivalent to the sum $J_0$ discussed earlier obtained with a weight ratio of α:(1−α), and the third to seventh terms are equivalent to the constraints of the formulas (5) to (8) discussed earlier. The constraints are preferably imposed, but may be added as necessary. The constraint of the formula (6) precedes the other. Beside the constraint of the formula (6), the constraint of the formula (5) precedes the rest.

—Evaluation Results—

A program that executes the respective steps of the above sound source separation method according to the present invention was prepared, and sound source separation was performed using 10 musical pieces (Nos. 1 to 10) selected from a popular music database (RWC-MDB-P-2001) registered on the RWC Music Database for researches, which is one of public music databases for researches. Each musical piece was utilized for a section of 30 seconds from the start. The details of the experimental conditions are listed in Table 3.

TABLE 3

| Experimental conditions | |
|---|---|
| **Frequency analysis** | |
| sampling rate | 44.1 kHz |
| STFT window | 2048 points Gaussian |
| **Parameters** | |
| # of partials: N | 20 |
| # of kernels in $E_{kly}$: $\gamma$ | 10 |
| $\beta_v$ | 0.1 |
| $\beta_u$ | 0.1 |
| $\beta_{I1}$ | 3.5 |
| $\beta_{I2}$ | 0.5 |
| **MIDI sound generator** | |
| test data | Yamaha MU2000 |
| template sounds | Roland SD-90 |

Template sounds and test musical pieces to be subjected to separation were generated with different MIDI sound sources. The parameters shown in FIG. 3 are experimentally obtained optimum parameters.

While one characteristic of the present invention is the use of a harmonic/inharmonic mixture model, experiments were also performed with the use of only a harmonic model and with the use of only an inharmonic model under the same conditions for comparison.

Figure 9:
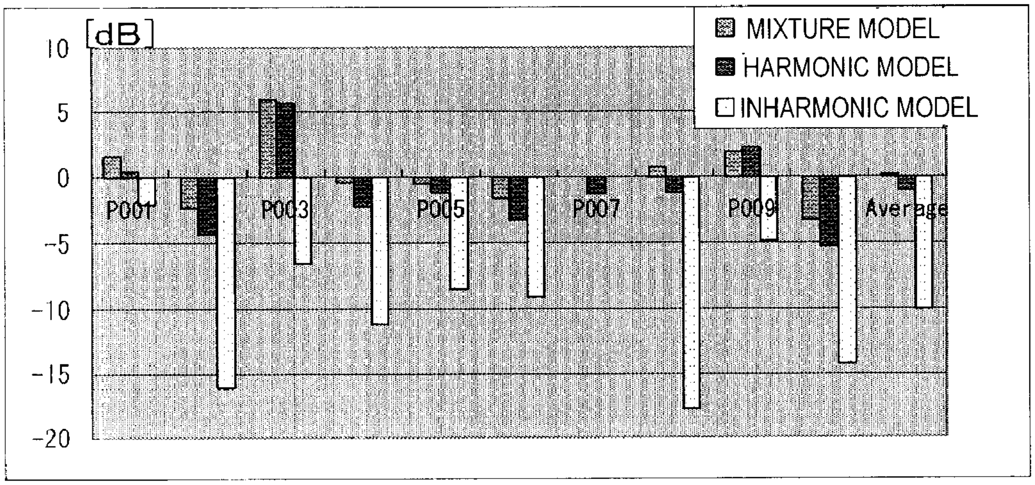
FIG. 9 is a chart showing the results of averaging SNRs (Signal to Noise Ratios) of respective instrument parts for each musical piece and averaging SNRs of all the musical pieces and all the instrument parts.

FIG. 9 is a chart showing the results of averaging SNRs (Signal to Noise Ratios) of respective instrument parts for each musical piece and averaging SNRs of all the musical pieces and all the instrument parts. The chart indicates that when averaged over the ten musical pieces, the SNR was the highest with the mixture model compared to the other, single-structure models.

INDUSTRIAL APPLICABILITY

According to the present invention, it is possible to separate power spectrograms of instrument sounds in consideration of both harmonic and inharmonic models, and hence to separate instrument sounds (sound sources) that are close to instrument sounds in the input audio signal. The present invention also makes it possible to freely increase and reduce the volume and apply a sound effect for each instrument part. The system and the method for sound source separation according to the present invention serve as a key technology for a computer program that enables implementation of an “instrument sound equalizer” that enables an individual to increase and reduce the volume of an instrument sound on a computer, without using expensive audio equipment that requires advanced operating techniques and that thus can conventionally be utilized only by some experts, providing significant industrial applicability.

What is claimed is:

1. A sound source separation system comprising:

a musical score information data storage section that stores musical score information data, the musical score information data being temporally synchronized with an input audio signal containing a plurality of instrument sound signals corresponding to a plurality of types of instrument sounds produced from a plurality of types of musical instruments, the musical score information data relating to a plurality of types of musical scores to be respectively played by the plurality of types of musical instruments corresponding to the plurality of instrument sound signals;

a model parameter assembled data preparation/storage section that respectively replaces a plurality of single tones contained in the plurality of types of musical scores with a plurality of model parameters to prepare a plurality of types of model parameter assembled data which correspond to the plurality of types of musical scores and which are formed by assembling the plurality of model parameters, and stores the plurality of types of model parameter assembled data in storage means, the plurality of model parameters being prepared in advance to represent a plurality of types of single tones respectively produced from the plurality of types of musical instruments with a plurality of harmonic/inharmonic mixture models each including a harmonic model and an inharmonic model, the plurality of model parameters containing a plurality of parameters for respectively forming the plurality of harmonic/inharmonic mixture models;

a first power spectrogram generation/storage section that reads a plurality of the model parameters at each time from the plurality of types of model parameter assembled data to generate a plurality of initial power spectrograms corresponding to the read model parameters using the plurality of parameters respectively contained in the read model parameters and a predetermined first model parameter conversion formula, and that stores the plurality of initial power spectrograms in storage means;

an initial distribution function computation/storage section that synthesizes the plurality of initial power spectrograms stored in the first power spectrogram generation/storage section at each time to prepare a synthesized power spectrogram at each time, computes at each time a plurality of initial distribution functions indicating proportions of the plurality of initial power spectrograms to the synthesized power spectrogram at each time, and stores the plurality of initial distribution functions in storage means;

a power spectrogram separation/storage section that in a first separation process separates a plurality of power spectrograms corresponding to the plurality of types of musical instruments at each time from a power spectrogram of the input audio signal at each time using the plurality of initial distribution functions at each time, and stores the plurality of power spectrograms in storage means, and that in second and subsequent separation processes separates a plurality of power spectrograms corresponding to the plurality of types of musical instruments at each time from the power spectrogram of the input audio signal at each time using a plurality of updated distribution functions, and stores the plurality of power spectrograms in the storage means;

an updated model parameter estimation/storage section that estimates a plurality of updated model parameters from the plurality of power spectrograms separated at each time, the plurality of updated model parameters containing a plurality of parameters necessary to represent the plurality of types of single tones with the harmonic/inharmonic mixture models, and that prepares a plurality of types of updated model parameter assembled data formed by assembling the plurality of updated model parameters, and stores the plurality of types of updated model parameter assembled data in storage means;

a second power spectrogram generation/storage section that reads a plurality of the updated model parameters at each time from the plurality of types of updated model parameter assembled data stored in the updated model parameter estimation/storage section to generate a plurality of updated power spectrograms corresponding to the read updated model parameters using the plurality of parameters respectively contained in the read updated model parameters and a predetermined second model parameter conversion formula, and stores the plurality of updated power spectrograms in storage means; and an updated distribution function computation/storage section that synthesizes the plurality of updated power spectrograms stored in the second power spectrogram generation/storage section at each time to prepare a synthesized power spectrogram at each time, computes at each time the plurality of updated distribution functions indicating proportions of the plurality of updated power spectrograms to the synthesized power spectrogram at each time, and stores the plurality updated distribution functions in storage means, wherein the updated model parameter estimation/storage section is configured to estimate the plurality of parameters respectively contained in the plurality of updated model parameters such that the plurality of updated power spectrograms gradually change from a state close to the plurality of initial power spectrograms to a state close to the plurality of power spectrograms most recently stored in the power spectrogram separation/storage section each time the power spectrogram separation/storage section performs the separation process for the second or subsequent time; and the power spectrogram separation/storage section, the updated model parameter estimation/storage section, the second power spectrogram generation/storage section, and the updated distribution function computation/storage section repeatedly perform process operations until the plurality of updated power spectrograms change from the state close to the plurality of initial power spectrograms to the state close to the plurality of power spectrograms most recently stored in the power spectrogram separation/storage section.

2. The sound source separation system according to claim 1, wherein the updated model parameter estimation/storage section is configured to define a cost function J on the basis of a sum $J_0$ of all of KL divergences $J_1 \times \alpha$, $\alpha$ being a real number of $0 \leqq \alpha \leqq 1$, between the plurality of power spectrograms at each time stored in the power spectrogram separation/storage section and the plurality of updated power spectrograms at each time stored in the second power spectrogram generation/storage section and KL divergences $J_2 \times (1-\alpha)$ between the plurality of updated power spectrograms at each time stored in the second power spectrogram generation/storage section and the plurality of initial power spectrograms at each time stored in the first power spectrogram generation/storage section and estimate the plurality of parameters respectively contained in the plurality of updated model parameters to minimize the cost function each time the power spectrogram separation/storage section performs the separation process;

$\alpha$ increases each time the separation process is performed; and the power spectrogram separation/storage section, the updated model parameter estimation/storage section, the second power spectrogram generation/storage section, and the updated distribution function computation/storage section repeatedly perform process operations until $\alpha$ becomes 1.

3. The sound source separation system according to claim 2, wherein each of the first and second model parameter conversion formulas uses the following harmonic/inharmonic mixture model:

$$h_{kl}=r_{klc}(H_{kl}(t,f)+I_{kl}(t,f))$$

where $h_{kl}$ is a power spectrogram of a single tone;

$r_{klc}$ is a parameter representing a relative amplitude in each channel;

$H_{kl}(t,f)$ is a harmonic model formed by a plurality of parameters representing features including an amplitude, temporal changes in a fundamental frequency F0, a y-th Gaussian weighted coefficient representing a general shape of a power envelope, a relative amplitude of an n-th harmonic component, an onset time, a duration, and diffusion along a frequency axis; and $I_{kl}(t,f)$ is an inharmonic model represented by a nonparametric function.

4. The sound source separation system according to claim 3, wherein the cost function used by the updated model parameter estimation/storage section includes a constraint for the inharmonic model not to represent a harmonic structure.

5. The sound source separation system according to claim 4, wherein the harmonic model includes a function $\mu_{kl}(t)$ for handling temporal changes in a pitch; and the cost function used by the updated model parameter estimation/storage section includes a constraint for the fundamental frequency F0 not to be temporally discontinuous.

6. The sound source separation system according to claim 5, wherein the cost function used by the updated model parameter estimation/storage section includes a constraint for making constant a relative amplitude ratio of a harmonic component for a single tone produced by an identical musical instrument for the harmonic model.

7. The sound source separation system according to claim 6, wherein the cost function used by the updated model parameter estimation/storage section includes a constraint for making constant an inharmonic component ratio for a single tone produced by an identical musical instrument for the inharmonic model.

8. The sound source separation system according to claim 1, further comprising:

a tone model-structuring model parameter preparation/storage section that prepares a plurality of model parameters on the basis of a plurality of templates, the plurality of templates being represented with a plurality of standard power spectrograms corresponding to a plurality of types of single tones respectively produced by the plurality of types of musical instruments, the plurality of model parameters being prepared to represent the plurality of types of single tones with a plurality of harmonic/inharmonic mixture models each including a harmonic model and an inharmonic model, the plurality of model parameters containing a plurality of parameters for respectively structuring the plurality of harmonic/inharmonic mixture models, the tone model-structuring model parameter preparation/storage section storing the plurality of model parameters in storage means in advance, wherein the model parameter assembled data preparation/storage section prepares the model parameter assembled data using the plurality of model parameters stored in the tone model-structuring model parameter preparation/storage section.

9. The sound source separation system according to claim 1, further comprising:

audio conversion means that converts information on a plurality of single tones for the plurality of musical instruments contained in the musical score information data into a plurality of parameter tones; and tone model-structuring model parameter preparation section that prepares a plurality of model parameters, the plurality of model parameters being prepared to represent a plurality of power spectrograms of the plurality of parameter tones with a plurality of harmonic/inharmonic mixture models each including a harmonic model and an inharmonic model, the plurality of model parameters containing a plurality of parameters for respectively structuring the plurality of harmonic/inharmonic mixture models, wherein the model parameter assembled data preparation/storage section prepares the model parameter assembled data using the plurality of model parameters prepared by the tone model-structuring model parameter preparation section.

10. A sound source separation method comprising the steps of:

preparing musical score information data, the musical score information data being temporally synchronized with an input audio signal containing a plurality of instrument sound signals corresponding to a plurality of types of instrument sounds produced from a plurality of types of musical instruments, the musical score information data relating to a plurality of types of musical scores to be respectively played by the plurality of types of musical instruments corresponding to the plurality of instrument sound signals;

preparing a plurality of types of model parameter assembled data corresponding to the plurality of types of musical scores, by respectively replacing a plurality of single tones contained in the plurality of types of musical scores with a plurality of model parameters, the model parameter assembled data being formed by assembling the plurality of model parameters, the plurality of model parameters being prepared in advance to represent a plurality of types of single tones respectively produced from the plurality of types of musical instruments with a plurality of harmonic/inharmonic mixture models each including a harmonic model and an inharmonic model, and the plurality of model parameters containing a plurality of parameters for respectively forming the plurality of harmonic/inharmonic mixture models;

reading a plurality of the model parameters at each time from the plurality of types of model parameter assembled data to generate a plurality of initial power spectrograms corresponding to the read model parameters using the plurality of parameters respectively contained in the read model parameters and a predetermined first model parameter conversion formula;

synthesizing the plurality of initial power spectrograms at each time to prepare a synthesized power spectrogram at each time, and computing at each time a plurality of initial distribution functions indicating proportions of the plurality of initial power spectrograms to the synthesized power spectrogram at each time;

in a first separation process, separating a plurality of power spectrograms corresponding to the plurality of types of musical instruments at each time from a power spectrogram of the input audio signal at each time using the plurality of initial distribution functions at each time, and in second and subsequent separation processes, separating a plurality of power spectrograms corresponding to the plurality of types of musical instruments at each time from the power spectrogram of the input audio signal at each time using a plurality of updated distribution functions;

estimating a plurality of updated model parameters from the plurality of power spectrograms separated at each time, the plurality of updated model parameters containing a plurality of parameters necessary to represent the plurality of types of single tones with the harmonic/inharmonic mixture models, to prepare a plurality of types of updated model parameter assembled data formed by assembling the plurality of updated model parameters;

reading a plurality of the updated model parameters at each time from the plurality of types of updated model parameter assembled data to generate a plurality of updated power spectrograms corresponding to the read updated model parameters using the plurality of parameters respectively contained in the read updated model parameters and a predetermined second model parameter conversion formula; and synthesizing the plurality of updated power spectrograms at each time to prepare a synthesized power spectrogram at each time, and computing at each time the plurality of updated distribution functions indicating proportions of the plurality of updated power spectrograms to the synthesized power spectrogram at each time, wherein the step of estimating the updated model parameter includes estimating the plurality of parameters respectively contained in the plurality of updated model parameters such that the plurality of updated power spectrograms gradually change from a state close to the plurality of initial power spectrograms to a state close to the plurality of power spectrograms most recently separated in the step of separating the power spectrogram each time the separation process is performed for the second or subsequent time; and the step of separating the power spectrogram, the step of estimating the updated model parameter, the step of generating the updated power spectrogram, and the step of computing the updated distribution function are repeatedly performed by a computer until the plurality of updated power spectrograms change from the state close to the plurality of initial power spectrograms to the state close to the plurality of power spectrograms most recently separated in the step of separating the power spectrogram.

11. The sound source separation method according to claim 10, wherein a cost function J is defined on the basis of a sum $J_0$ of all of KL divergences $J_1 \times \alpha$, $\alpha$ being a real number of $0 \leqq \alpha \leqq 1$, between the plurality of power spectrograms at each time and the plurality of updated power spectrograms at each time and KL divergences $J_2 \times (1-\alpha)$ between the plurality of updated power spectrograms at each time and the plurality of initial power spectrograms at each time and the plurality of parameters respectively contained in the plurality of updated model parameters are estimated to minimize the cost function each time the separation process is performed for the second or subsequent time in the power spectrogram separation step;

$\alpha$ is increased each time the separation process is performed; and the separation process is terminated when $\alpha$ becomes 1.

12. A computer having a computer program for sound source separation installed on a computer to cause the computer to execute the steps of:

preparing musical score information data, the musical score information data being temporally synchronized with an input audio signal containing a plurality of instrument sound signals corresponding to a plurality of types of instrument sounds produced from a plurality of types of musical instruments, the musical score information data relating to a plurality of types of musical scores to be respectively played by the plurality of types of musical instruments corresponding to the plurality of instrument sound signals;

preparing a plurality of types of model parameter assembled data corresponding to the plurality of types of musical scores, by respectively replacing a plurality of single tones contained in the plurality of types of musical scores with a plurality of model parameters, the model parameter assembled data being formed by assembling the plurality of model parameters, the plurality of model parameters being prepared in advance to represent a plurality of types of single tones respectively produced from the plurality of types of musical instruments with a plurality of harmonic/inharmonic mixture models each including a harmonic model and an inharmonic model, and the plurality of model parameters containing a plurality of parameters for respectively forming the plurality of harmonic/inharmonic mixture models;

reading a plurality of the model parameters at each time from the plurality of types of model parameter assembled data to generate a plurality of initial power spectrograms corresponding to the read model parameters using the plurality of parameters respectively contained in the read model parameters and a predetermined first model parameter conversion formula;

synthesizing the plurality of initial power spectrograms at each time to prepare a synthesized power spectrogram at each time, and computing at each time a plurality of initial distribution functions indicating proportions of the plurality of initial power spectrograms to the synthesized power spectrogram at each time;

in a first separation process, separating a plurality of power spectrograms corresponding to the plurality of types of musical instruments at each time from a power spectrogram of the input audio signal at each time using the plurality of initial distribution functions at each time, and in second and subsequent separation processes, separating a plurality of power spectrograms corresponding to the plurality of types of musical instruments at each time from the power spectrogram of the input audio signal at each time using a plurality of updated distribution functions;

estimating a plurality of updated model parameters from the plurality of power spectrograms separated at each time, the plurality of updated model parameters containing a plurality of parameters necessary to represent the plurality of types of single tones with the harmonic/inharmonic mixture models, to prepare a plurality of types of updated model parameter assembled data formed by assembling the plurality of updated model parameters;

reading a plurality of the updated model parameters at each time from the plurality of types of updated model parameter assembled data to generate a plurality of updated power spectrograms corresponding to the read updated model parameters using the plurality of parameters respectively contained in the read updated model parameters and a predetermined second model parameter conversion formula; and synthesizing the plurality of updated power spectrograms at each time to prepare a synthesized power spectrogram at each time, and computing at each time the plurality of updated distribution functions indicating proportions of the plurality of updated power spectrograms to the synthesized power spectrogram at each time, wherein the step of estimating the updated model parameter includes estimating the plurality of parameters respectively contained in the plurality of updated model parameters such that the plurality of updated power spectrograms gradually change from a state close to the plurality of initial power spectrograms to a state close to the plurality of power spectrograms most recently separated in the step of separating the power spectrogram each time the separation process is performed for the second or subsequent time; and the step of separating the power spectrogram, the step of estimating the updated model parameter, the step of generating the updated power spectrogram, and the step of computing the updated distribution function are repeatedly performed until the plurality of updated power spectrograms change from the state close to the plurality of initial power spectrograms to the state close to the plurality of power spectrograms most recently separated in the step of separating the power spectrogram.

* * * * *